(12) United States Patent
Lee et al.

(10) Patent No.: US 10,877,242 B2
(45) Date of Patent: Dec. 29, 2020

(54) CAMERA MODULE

(71) Applicant: LG ELECTRONICS INC., Seoul (KR)

(72) Inventors: Dongjin Lee, Seoul (KR); Jongpil Kim, Seoul (KR); Hakhae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 397 days.

(21) Appl. No.: 15/568,363

(22) PCT Filed: Jul. 28, 2015

(86) PCT No.: PCT/KR2015/007835
§ 371 (c)(1),
(2) Date: Oct. 20, 2017

(87) PCT Pub. No.: WO2016/171334
PCT Pub. Date: Oct. 27, 2016

(65) Prior Publication Data
US 2018/0149833 A1   May 31, 2018

(30) Foreign Application Priority Data

Apr. 23, 2015   (KR) .................. 10-2015-0057455

(51) Int. Cl.
*G02B 3/02*   (2006.01)
*G02B 21/02*   (2006.01)
(Continued)

(52) U.S. Cl.
CPC ........... *G02B 9/60* (2013.01); *G02B 13/0045* (2013.01); *G02B 27/646* (2013.01); *G03B 9/06* (2013.01);
(Continued)

(58) Field of Classification Search
CPC ........ G02B 13/18; G02B 21/02; G02B 13/08; G02B 15/177; G02B 13/02; G02B 13/04; G02B 9/60
(Continued)

(56) References Cited

U.S. PATENT DOCUMENTS

2011/0050982 A1*   3/2011   Katsuyama .......... H04N 5/2254
348/345
2011/0157721 A1*   6/2011   Ohtake .................. G02B 7/102
359/695
(Continued)

FOREIGN PATENT DOCUMENTS

JP   2011-227362 A   11/2011
JP   2013-54294 A   3/2013
(Continued)

*Primary Examiner* — Dawayne Pinkney
(74) *Attorney, Agent, or Firm* — Birch, Stewart, Kolasch & Birch, LLP

(57) ABSTRACT

The present invention relates to a camera module mounted in a mobile terminal, comprising: a first lens group having a first lens, which has a positive (+) refractive power, and a second lens, which has a negative (−) refractive power, in order from the object side, wherein the first and second lenses are integrally formed through a first lens barrel; a variable aperture for controlling the quantity of light incident into an optical system; and a second lens group having a third lens having a negative (−) refractive power, a fourth lens having a positive (+) refractive power, and a fifth lens having a positive (+) refractive power, wherein the third to fifth lenses are integrally formed through a second lens barrel.

27 Claims, 15 Drawing Sheets

(51) Int. Cl.
  *G02B 15/14* (2006.01)
  *G02B 13/04* (2006.01)
  *G02B 9/60* (2006.01)
  *G03B 9/06* (2006.01)
  *H04N 5/232* (2006.01)
  *G02B 27/64* (2006.01)
  *H04N 5/357* (2011.01)
  *G02B 13/00* (2006.01)
  *H04N 5/225* (2006.01)

(52) U.S. Cl.
  CPC ....... *H04N 5/2254* (2013.01); *H04N 5/23287* (2013.01); *H04N 5/3572* (2013.01); *G03B 2205/0061* (2013.01); *G03B 2205/0069* (2013.01)

(58) Field of Classification Search
  USPC ....... 359/714, 659, 671, 691, 746, 753, 763, 359/764
  See application file for complete search history.

(56) References Cited

U.S. PATENT DOCUMENTS

| | | | |
|---|---|---|---|
| 2011/0290886 A1* | 12/2011 | Carlson | G06K 7/10722 235/462.24 |
| 2015/0109692 A1* | 4/2015 | Son | G02B 13/0045 359/757 |
| 2016/0238832 A1* | 8/2016 | Sasamoto | G02B 7/025 |

FOREIGN PATENT DOCUMENTS

| | | |
|---|---|---|
| JP | 2013-122575 A | 6/2013 |
| JP | 2014-123092 A | 7/2014 |
| KR | 10-2005-0102841 A | 10/2005 |
| KR | 10-2009-0047745 A | 5/2009 |
| KR | 10-2011-0024872 A | 3/2011 |
| KR | 10-2013-0053509 A | 5/2013 |
| KR | 10-1504034 B1 | 3/2015 |

* cited by examiner

FIG. 5
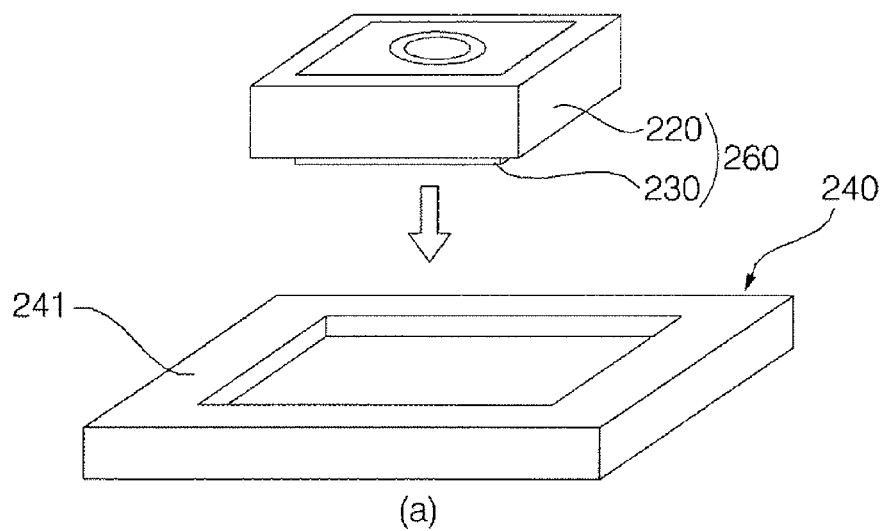
(a)
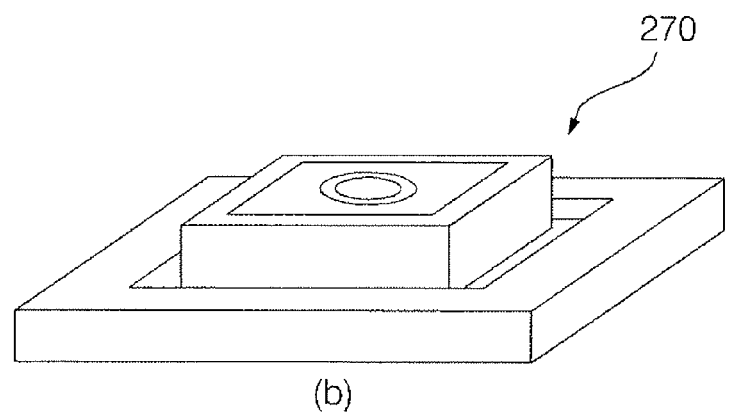
(b)

FIG. 6
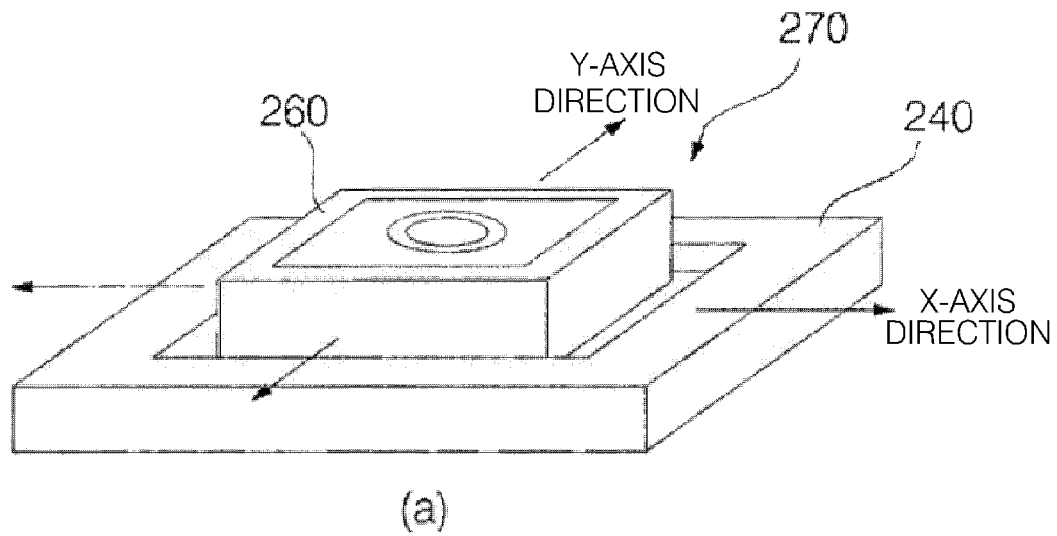
(a)
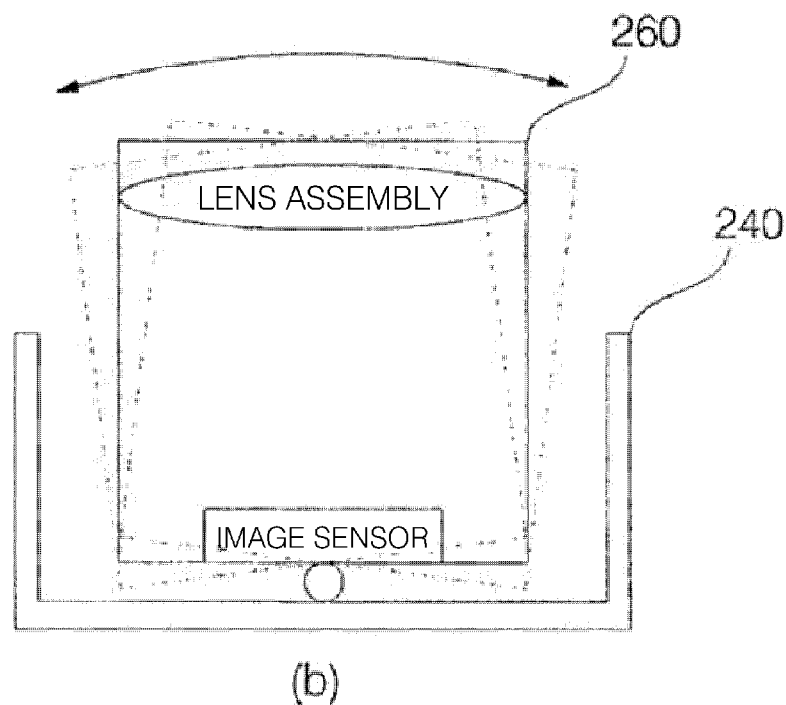
(b)

FIG. 7
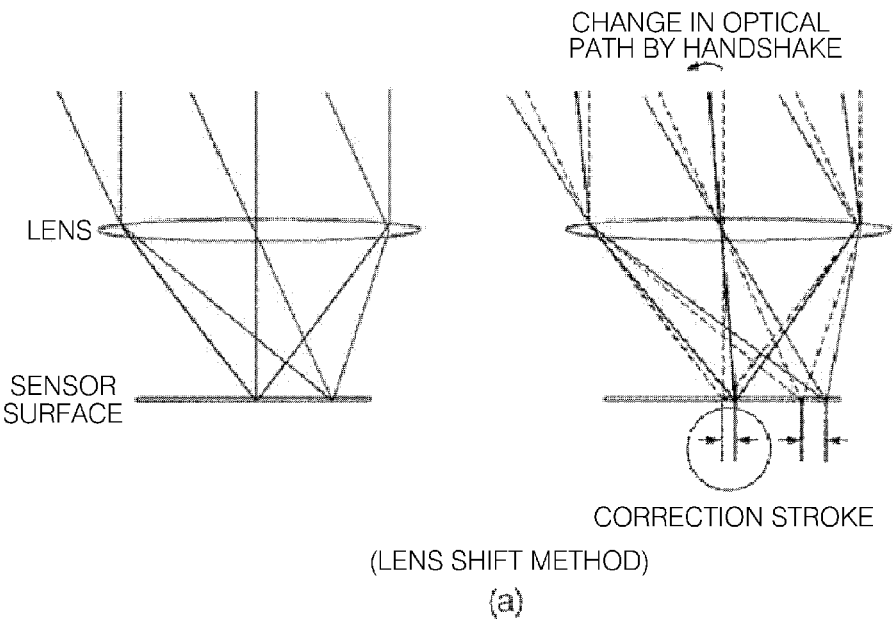
(LENS SHIFT METHOD)
(a)
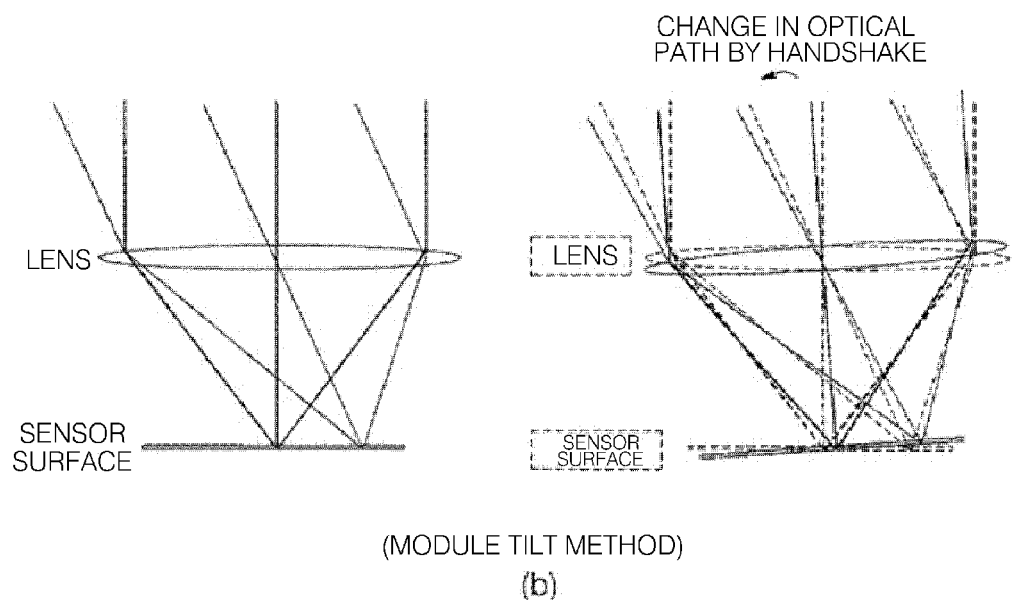
(MODULE TILT METHOD)
(b)

CAMERA MODULE

CROSS REFERENCE TO RELATED APPLICATIONS

This application is the National Phase of PCT International Application No. PCT/KR2015/007835, filed on Jul. 28, 2015, which claims priority under 35 U.S.C. 119(a) to Patent Application No. 10-2015-0057455, filed in Republic of Korea on Apr. 23, 2015, all of which are hereby expressly incorporated by reference into the present application.

TECHNICAL FIELD

The present invention relates to a camera module mounted in a mobile terminal, and more particularly, to a camera module having an optical lens structure using a variable aperture.

BACKGROUND ART

Terminals may be generally classified into mobile/portable terminals and stationary terminals depending on their mobility. Mobile terminals may also be classified into handheld terminals and vehicle mounted terminals depending on whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality, which supports game playing, while other terminals are configured as multimedia players. More recently, mobile terminals have been configured to receive broadcast and multicast signals which permit viewing of content such as videos and television programs.

As such functions become more diversified, the mobile terminal may support more complicated functions such as capturing images or video, reproducing music or video files, playing games, receiving broadcast signals, and the like. By comprehensively and collectively implementing such functions, it is conceivable to improve the terminal from the aspect of structural parts and/or software parts.

In particular, there are many cases where photographs are taken using terminals, and thus studies on the structure of a mobile terminal having mounted therein a camera module, which is coming to exhibit high-performance functions such as, for example, an optical zoom function, an auto-focusing function, a handshake correction function and has a compact structure, are actively being carried out.

In addition, the camera module mounted in the mobile terminal uses a variable aperture, and thus requires an optical lens structure based on the variable aperture. However, in a conventional mobile terminal, because a variable aperture is located at the foremost position of a lens barrel, the brightness of an image captured by a fixed lens group may be deteriorated upon variation of the aperture, which may deteriorate the quality of the image.

In addition, vignetting of an image may be caused in the process of reducing the diameter of the variable aperture, which causes the periphery of a formed image to be blacked out. Vignetting refers to the phenomenon in which the diameter of an image circle is shorter than the diagonal length of an imaging screen, whereby the image does not extend to the corner portions. A conventional optical lens structure uses a single fixed lens barrel, and it is difficult to attain a lens structure for compensating for the same. Therefore, there is an urgent demand for a novel optical lens structure capable of compensating for deterioration in the resolution of an image and effectively preventing the vignetting of an image when a variable aperture is mounted.

DISCLOSURE

Technical Problem

An object of the present invention is devised to solve the above-described problems and other problems. Another object of the present invention is to provide a camera module capable of realizing a bright image via an optical lens structure in which a variable aperture is disposed between a first lens group and a second lens group.

A further object of the present invention is to provide a camera module capable of realizing reduced size and increased assembly efficiency of a mobile terminal owing to an integrated structure of a first lens group, a second lens group, a variable aperture, and an AF driver.

Technical Solution

To achieve the above or other objects, according to one aspect of the present invention, there is provided a camera module of a mobile terminal, including a first lens group including a first lens having a positive (+) refractive power and a second lens having a negative (−) refractive power in sequence from an object side, the first and second lenses being integrally formed via a first lens barrel, a variable aperture configured to adjust the quantity of light introduced into an optical system, and a second lens group including a third lens having a negative (−) refractive power, a fourth lens having a positive (+) refractive power, and a fifth lens having a negative (−) refractive power, the third to fifth lenses being integrally formed via a second lens barrel.

In addition, according to another aspect of the present invention, there is provided a camera module of a mobile terminal, including a first lens group including a first lens having a positive (+) refractive power and a second lens having a negative (−) refractive power in sequence from an object side, the first and second lenses being integrally formed via a first lens barrel, a variable aperture configured to adjust the quantity of light introduced into an optical system, and a second lens group including a third lens having a negative (−) refractive power, a fourth lens having a positive (+) refractive power, a fifth lens having a positive (+) refractive power, and a sixth lens having a negative (−) refractive power, the third to sixth lenses being integrally formed via a second lens barrel.

Advantageous Effects

The effects of a mobile terminal and a control method thereof according to the present invention are as follows.

According to at least one of embodiments of the present invention, a lens assembly in which a variable aperture is disposed between a first lens group and a second lens group is mounted in a camera module, whereby vignetting of an image may be prevented and a high-quality bright image may be realized.

In addition, according to at least one of embodiments of the present invention, a camera module in which a first lens group, a second lens group, a variable aperture, and an AF driver are integrally formed with one another is mounted in a mobile terminal, whereby reduced size and increased assembly efficiency of the mobile terminal may be realized.

Meanwhile, various other effects are directly or suggestively disclosed in a detailed description related to embodiments of the present invention, which will be described below.

DESCRIPTION OF DRAWINGS

FIGS. 5 to 7 are views referenced for explaining the configuration and driving method of an OIS module mounted in the camera module according to the present invention;

MODE FOR INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
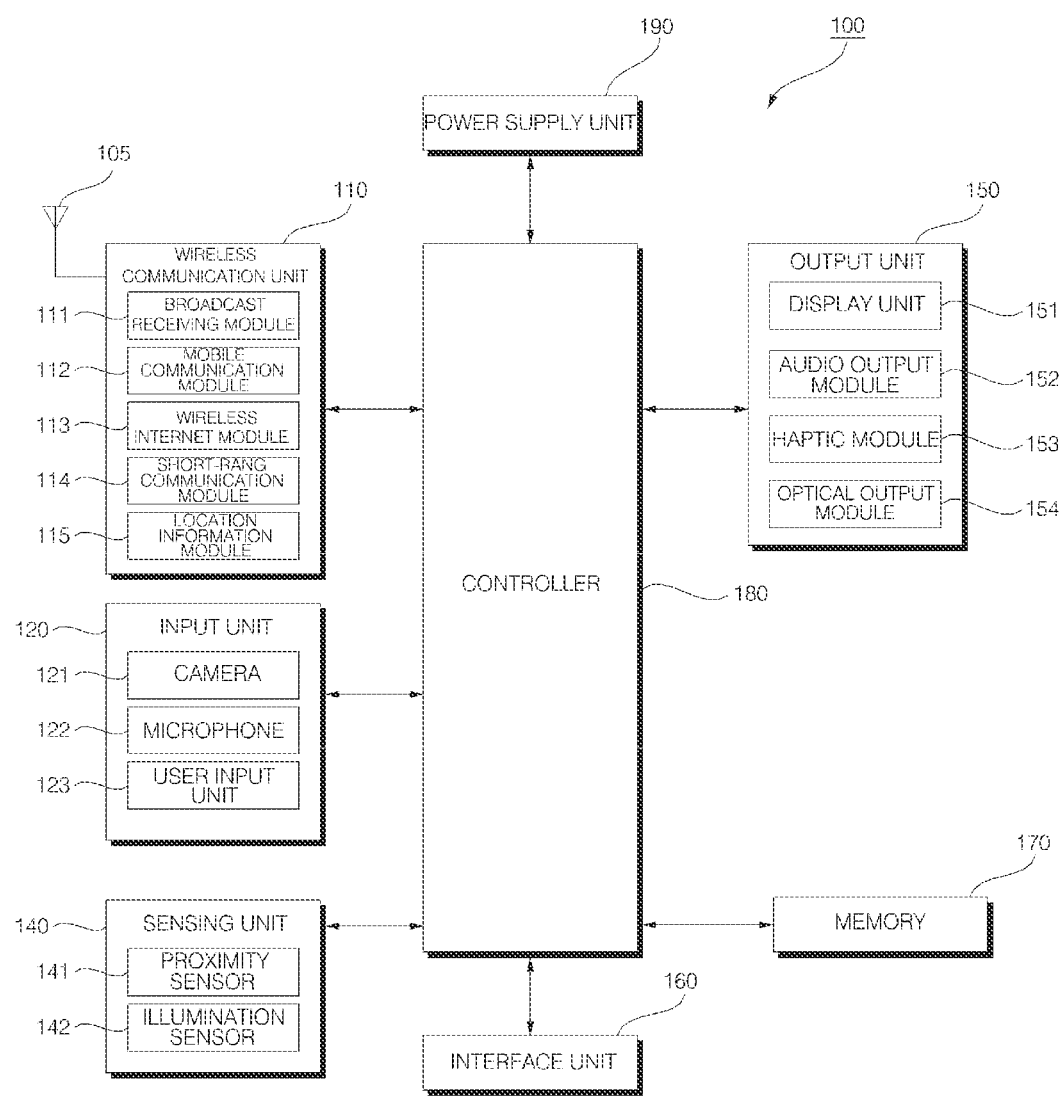
FIG. 1A is a block diagram for explaining a mobile terminal according to the present invention.
Figure 1B:
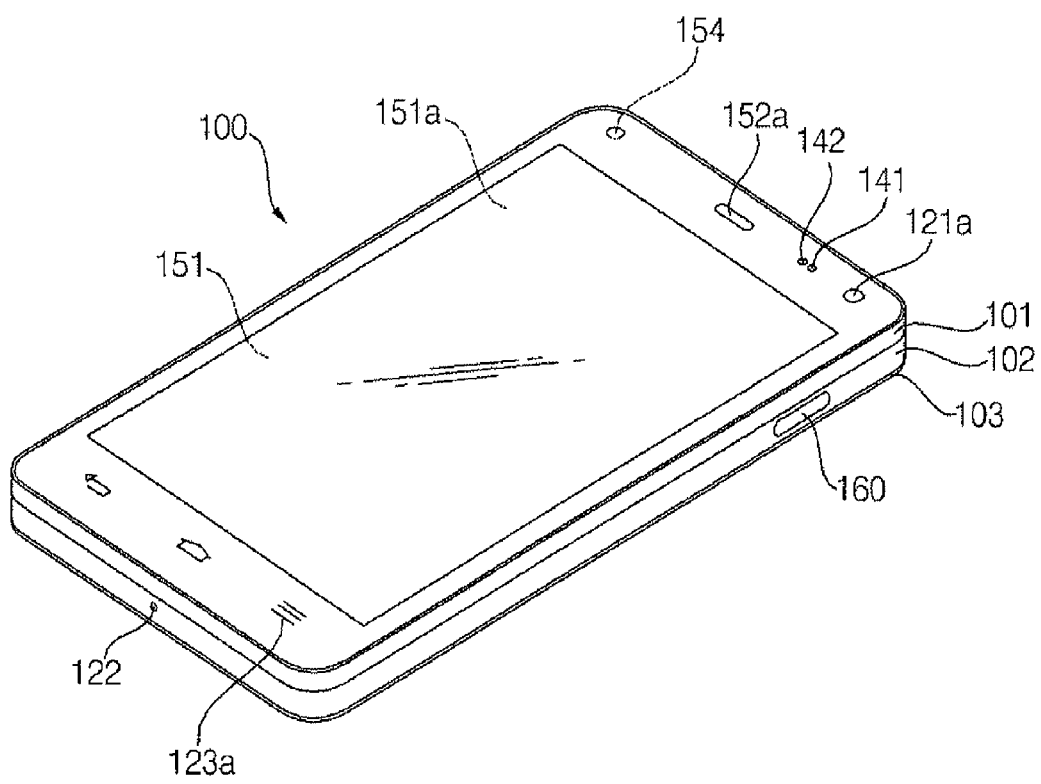
FIGS. 1B and 1C are conceptual views of one example of the mobile terminal according to the present invention, viewed from different directions.
Figure 1C:
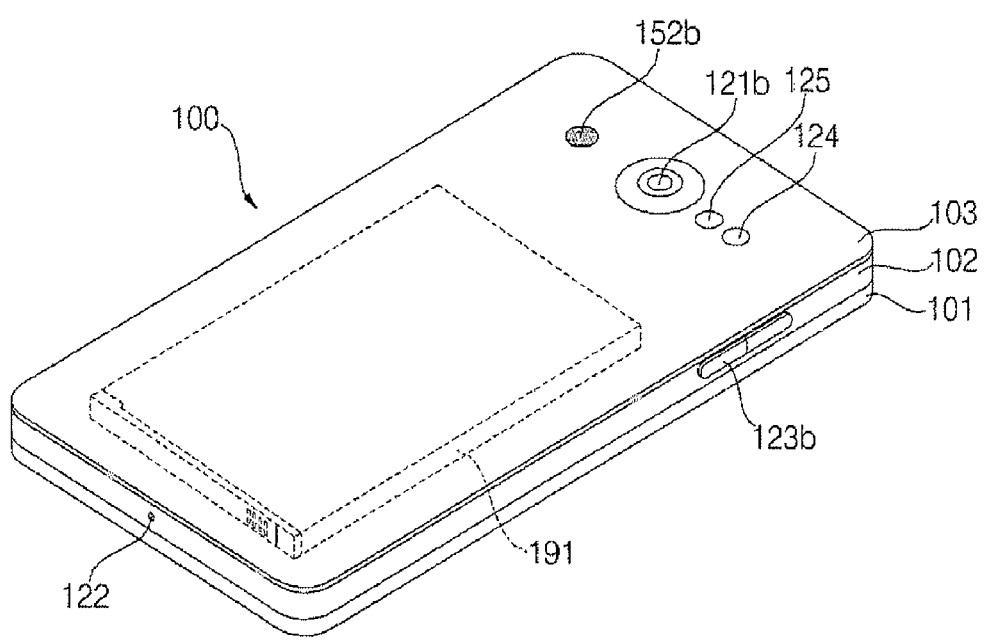

Reference is now made to FIGS. 1A to 1C, where FIG. 1A is a block diagram of a mobile terminal in accordance with the present disclosure, and FIGS. 1B and 1C are conceptual views of one example of the mobile terminal, viewed from different directions.

The mobile terminal 100 is illustrated, which includes components such as a wireless communication unit 110, an input unit 120, a sensing unit 140, an output unit 150, an interface unit 160, a memory 170, a controller 180, and a power supply unit 190. It is understood that implementing all of the illustrated components in FIG. 1A is not a requirement, and that a greater or fewer number of components may alternatively be implemented.

More specifically, the wireless communication unit 110 typically includes one or more modules, which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules, which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, and the like) for allowing a user to input information. Audio data or image data may be obtained by the input unit 120 and may be analyzed and processed by user commands.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), the microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal may be configured to combine and utilize information obtained from at least two of the aforementioned sensors.

The output unit 150 is typically configured to output various types of information, such as audio, video, tactile output, and the like. The output unit is illustrated, which includes at least one of a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123, which provides an input interface between the mobile terminal 100 and the user.

The interface unit 160 serves as an interface with various types of external devices that may be coupled to the mobile terminal 100. The interface unit 160, for example, may include at least one of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

In addition, the controller 180 may control at least some of the components described above in the manner illustrated in FIG. 1A, in order to drive application programs stored in the memory 170. Moreover, the controller 180 may combine and operate two or more of the components included in the mobile terminal 100 in order to drive the application programs.

The power supply unit 190 may be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application programs stored in the memory 170.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

Here, the terminal body may be understood to refer to the concept of this bore a mobile terminal (100) to at least one of the aggregate.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is located on the front side of the terminal body to output information. As illustrated, a window 151*a* of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. A rear cover 103 is illustrated, which covers the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121*b* or an audio output module 152*b*.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151*a* and the front case 101, between the front case 101 and the rear case 102, or between the rear case 102 and the rear cover 103, to hermetically seal an inner space when those cases are coupled.

The mobile terminal 100 may include, for example, the display unit 151, first and second audio output modules 152*a* and 152*b*, the proximity sensor 141, the illumination sensor 142, the optical output module 154, first and second cameras 121*a* and 121*b*, first and second manipulation units 123*a* and 123*b*, the microphone 122, and the interface unit 160.

It will be described for the mobile terminal as shown in FIGS. 1B and 1C. The display unit 151, the first audio output module 152*a*, the proximity sensor 141, the illumination sensor 142, the optical output module 154, the first camera 121*a* and the first manipulation unit 123*a* are arranged on the front surface of the terminal body, the second manipulation unit 123*b*, the microphone 122 and the interface unit 160 are arranged on the side surface of the terminal body, and the second audio output modules 151*b* and the second camera 121*b* are arranged on the rear surface of the terminal body.

It is to be understood that alternative arrangements are possible and within the teachings of the instant disclosure. Some components may be omitted or rearranged. For example, the first manipulation unit 123*a* may be located on another surface of the terminal body, and the second audio output module 152*b* may be located on the side surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which may implement the same or different display technology. For instance, a plurality of the display units may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which may be indicated or designated in various modes.

The touch sensor may be configured in a form of a film having a touch pattern, disposed between the window 151*a* and a display on a rear surface of the window 151*a*, or a metal wire which is patterned directly on the rear surface of the window 151*a*. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123*a*.

The first audio output module 152*a* may be implemented in the form of a receiver to transmit calling sound to the user's ear, and the second audio output module 152*b* may be implemented in the form of a loud speaker to output voice audio, alarm sounds, multimedia audio reproduction, and the like.

The window 151*a* of the display unit 151 will typically include an aperture to permit audio generated by the first audio output module 152*a* to pass. One alternative is to allow audio to be released along an assembly gap between the structural bodies (for example, a gap between the window 151*a* and the front case 101). In this case, a hole independently formed to output audio sounds may not be seen or is otherwise hidden in terms of appearance, thereby further simplifying the appearance and manufacturing of the mobile terminal 100.

The optical output module 154 may be configured to output light for indicating an event generation. Examples of such events include a message reception, a call signal reception, a missed call, an alarm, a schedule notice, an email reception, information reception through an application, and the like. When a user has checked a generated event, the controller 180 may control the optical output unit 154 to stop the light output.

The first camera 121*a* may process image frames such as still or moving images obtained by the image sensor in a capture mode or a video call mode. The processed image frames may then be displayed on the display unit 151 or stored in the memory 170.

In addition, the first camera 121*a* may include a plurality of lenses arranged in at least one line. The plurality of lenses may also be arranged in a matrix configuration. Such a camera may be referred to as an "array camera". When the first camera 121*a* is implemented as an array camera, images may be captured in various manners using the plurality of lenses and images with better qualities.

The first and second manipulation units 123*a* and 123*b* are examples of the user input unit 123, which may be manipulated by a user to provide input to the mobile terminal 100. The first and second manipulation units 123*a* and 123*b* may also be commonly referred to as a manipulating portion, and may employ any tactile method that allows the user to perform manipulation such as touch, push, scroll, or the like. The first and second manipulation units 123*a* and 123*b* may also employ any non-tactile method that allows the user to perform manipulation such as proximity touch, hovering, or the like.

FIG. 1B illustrates the first manipulation unit 123*a* as a touch key, but the present invention is not limited thereto. For example, possible alternatives of the first manipulation unit 123*a* include a push key, a touch key, and combinations thereof.

Input received at the first and second manipulation units 123*a* and 123*b* may be used in various ways. For example, the first manipulation unit 123*a* may be used by the user to provide an input to a menu, home key, cancel, search, or the like, and the second manipulation unit 123*b* may be used by the user to provide an input to control a volume level being output from the first or second audio output modules 152*a* or 152*b*, to switch to a touch recognition mode of the display unit 151, or the like.

As another example of the user input unit 123, a rear input unit (not shown) may be located on the rear surface of the terminal body. The rear input unit may be manipulated by a user to provide input to the mobile terminal 100. The input may be used in a variety of different ways. For example, the rear input unit may be used by the user to provide an input for power on/off, start, end, scroll, control volume level being output from the first or second audio output modules 152*a* or 152*b*, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit may be positioned at most any location of the rear side of the terminal body.

When the rear input unit is provided on the rear surface of the terminal body, a user interface using the same may be realized. In addition, embodiments that include the rear input unit may implement some or all of the functionality of the first manipulation unit 123a in the rear input unit. As such, in situations where the first manipulation unit 123a is omitted from the front side, the display unit 151 may have a larger screen.

As a further alternative, the mobile terminal 100 may include a finger scan sensor which scans a user's fingerprint. The controller 180 may then use fingerprint information sensed by the finger scan sensor as part of an authentication procedure. The finger scan sensor may also be installed in the display unit 151 or implemented in the user input unit 123.

The microphone 122 is shown located at an end of the mobile terminal, but other locations are possible. If desired, multiple microphones 122 may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is located at the rear side of the terminal body and includes an image capture direction that is substantially opposite to the image capture direction of the first camera unit 121a.

The second camera 121b may include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is located adjacent to the second camera 121b. When an image of a subject is captured with the camera 121b, the flash 124 may illuminate the subject.

The second audio output module 152b may be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (see FIG. 1A) may be retractable into the terminal body. Alternatively, an antenna may be formed using a film attached to an inner surface of the rear cover 103, or a case that includes a conductive material.

A power supply unit 190 (see FIG. 1A) for supplying power to the mobile terminal 100 may be provided on the terminal body. The power supply unit 190 may include a battery 191, which is mounted in the terminal body or detachably coupled to the exterior of the terminal body.

The battery 191 may receive power via a power source cable connected to the interface unit 160. Also, the battery 191 may be recharged in a wireless manner using a wireless charger. Wireless charging may be implemented by magnetic induction or resonance (electromagnetic resonance).

The rear cover 103 is coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 may also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

The configuration of the mobile terminal 100 according to the present invention has been described above with reference to FIGS. 1A to 1C. Hereinafter, the configuration of a camera module used in the mobile terminal and the configuration of a lens assembly mounted in the camera module according to the present invention will be described in detail.

Figure 2:
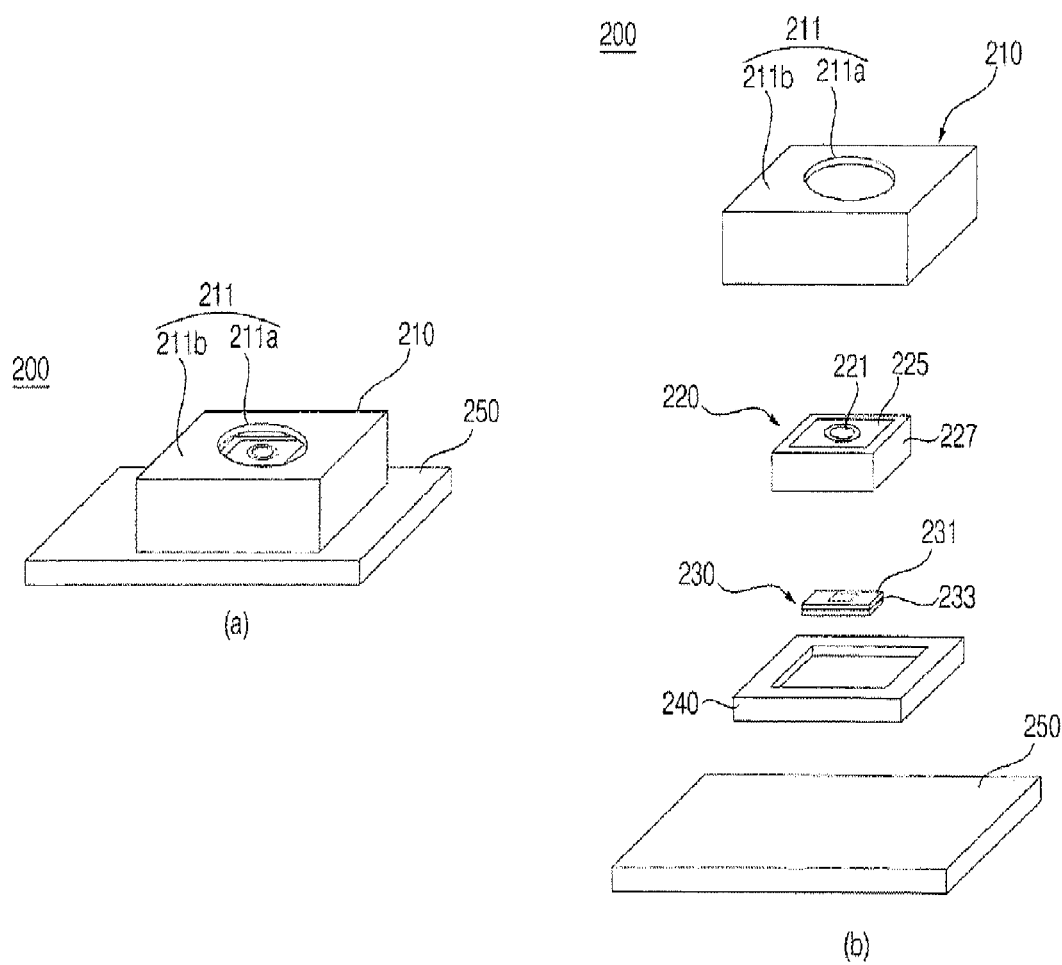
FIG. 2 is a view referenced for explaining a camera module of the mobile terminal according to the present invention.

FIG. 2 is a view referenced for explaining a camera module of the mobile terminal according to the present invention.

Referring to FIG. 2, the camera module 200 according to one embodiment of the present invention includes a housing 210, an AF module 220, a sensor module 230, an OIS driver 240, and a printed circuit board 260. The AF module 220 includes a first lens group 221, a second lens group (not illustrated), an aperture 225, and an AF driver 227, and has an integrated structure in which these components are integrally coupled with one another. A detailed description thereof will be described below with reference to FIG. 3.

The housing 210 is mounted inside a terminal main body so that at least a portion thereof is exposed outward. In addition, the housing 210 may have a polyhedral shape having a plurality of faces, and may have a hexahedral shape.

A first face 211 of the housing 210 faces the outside of the mobile terminal 100 and includes a first area 211a and a second area 211b. The first area 211a is formed so as to correspond to the area in which the first lens group 221 may receive light. The first lens area 211a may have a size that is equal to or slightly greater than the diameter of a lens that is closest to the first face 211, among lenses of the first lens group 221. In addition, the first area 211a may be formed to be transparent because it needs to transmit light.

The second area 211b surrounds the first area 211a and occupies the remaining portion of the first face 211. The second area 211b may be formed to be opaque so that light does not pass therethrough well. This is because light that passes through the second area 211b may interfere with the light that is introduced through the first lens group 221.

A second face (not illustrated) of the housing 210 is disposed opposite the first face 211. That is, the second face faces the inside of the terminal, rather than facing the outside of the terminal. The second face may be coupled to the printed circuit board 250, which is provided inside the terminal, so as to be fixed inside the terminal. In addition, the housing 210 may further include, for example, a mounting board (not illustrated) and a mounting member (not illustrated) in order to be mounted to the printed circuit board 250, which is provided inside the mobile terminal.

The AF module 220 is disposed close to the first face 211a of the housing 210. The AF module 220 is mounted inside the housing 210 so that at least a portion of the first lens group 221 is exposed outward.

The AF module 220 performs an auto-focusing function while moving an IRIS module 226 mounted therein in the Z-axis direction using the AF driver 227. Here, the IRIS module 226 includes the first lens group 221, the second lens group (not illustrated), and the aperture 225, and has an integrated structure in which these components are integrally coupled with one another.

The AF driver 227 is any one of a voice coil motor (VCM) type, a piezoelectric (PZT) type, or a rotation motor type in terms of the generation of a drive force. In the camera module 200 according to the present invention, the AF driver may be of a PZT type. Here, in the PZT-type, a drive element is moved via deformation of a piezoelectric element when a voltage is applied using the piezoelectric element.

The sensor module 230 includes an infrared filter 231 and an image sensor 233 and is coupled to the lower surface of the AF module 220. The infrared filter 231 is disposed between the IRIS module 226 and the image sensor 233 and functions to prevent radiant heat from external light from being transferred to the image sensor 233.

The image sensor 233 converts an optical signal, which has passed through the first lens group 221, the aperture 225, the second lens group (not illustrated), and the infrared filter 231 and has been introduced thereinto, into an electrical signal. Here, the image sensor 233 may be a charge-coupled device (CCD) or a complementary metal oxide semiconductor (CMOS).

The optical image stabilization (OIS) driver 240 is coupled to the printed circuit board 250, which is disposed inside the terminal. In addition, a module assembly in which the AF module 220 and the sensor module 230 are coupled to each other is mounted in the OIS driver 240. The OIS driver 240 performs a handshake correction function while moving the module assembly in the X-axis direction and/or the Y-axis direction using a magnetic field.

When the user captures an image while holding the mobile terminal in his/her hand, the mobile terminal may be shaken. At this time, the OIS driver 240 may vibrate the module assembly so as to correspond to the shaking of the terminal during image capture so that the image is automatically corrected. The vibration may be generated in the direction opposite the direction in which the mobile terminal is shaken.

Figure 3:
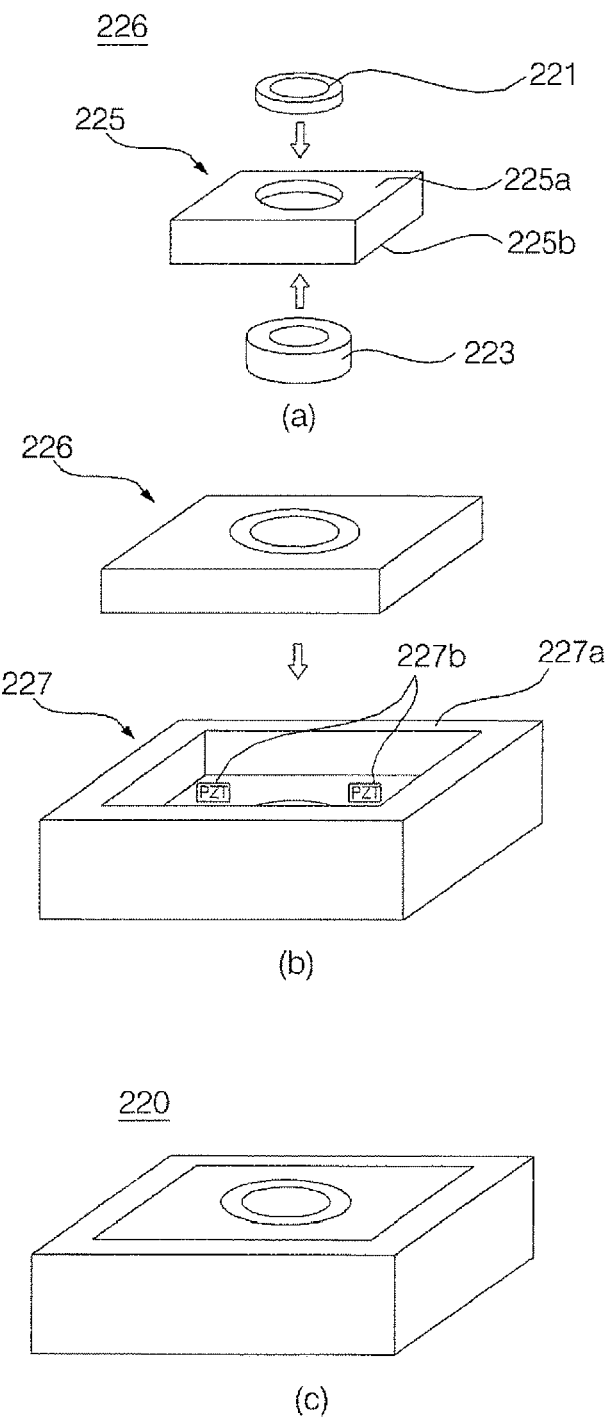
FIGS. 3 and 4 are views referenced for explaining the configuration and driving method of an AF module mounted in the camera module according to the present invention.
Figure 4:
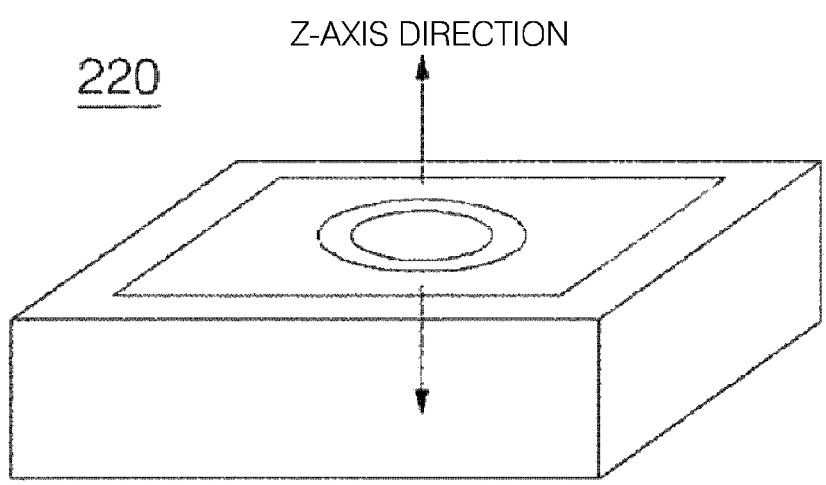

FIGS. 3 and 4 are views referenced for explaining the configuration and driving method of the AF module mounted in the camera module according to the present invention.

Referring to FIG. 3, the first lens group 221 includes a plurality of lenses and is integrally formed via a first lens barrel. The lenses are configured to focus the light that is introduced from a subject.

The second lens group 223 includes a plurality of lenses and is integrally formed via a second lens barrel. The lenses are configured to compensate for the light that has passed through the first lens group 221 and the aperture 225.

The aperture 225 is disposed between the first lens group 221 and the second lens group 223 and adjusts the quantity of light that is introduced through an optical system. The aperture 225 has a first opening formed in a first face 225a thereof so that the first lens group 221 is inserted into the first opening. The first opening may be formed to be equal to or slightly greater than the diameter of the first lens group 221. In addition, the first opening may have a shape for firmly coupling with the first lens barrel.

The aperture 225 has a second opening formed in a second face 225b thereof so that the second lens group 223 is inserted into the second opening. The second opening may be formed to be equal to or slightly greater than the diameter of the second lens group 223. In addition, the second opening may have a shape for firmly coupling with the second lens barrel.

When the first lens group 221 and the second lens group 223 are inserted into the aperture 225, the IRIS module 226 having an integrated structure is configured.

The AF driver 227 includes a frame 227a and a moving element 227b.

The frame 227a may be formed in a rectangular shape or any of various other shapes so as to accommodate the IRIS module 226 therein. The moving element 227b may be disposed on the frame 227a, which comes into contact with the lower surface 225b of the IRIS module 226. In addition, a separate moving member (not illustrated) may be further disposed between the IRIS module 226 and the moving element 227b.

As the IRIS module 226 is inserted into the frame 227a of the AF driver 227, the AF module 220 is configured. That is, the AF module 220 has an integrated structure in which the first lens group 221, the second lens group 223, the aperture 225, and the AF driver 227 are integrally coupled with one another. Meanwhile, although the present embodiment exemplifies that the aperture 225 of the AF module is disposed between the first lens group 221 and the second lens group 223 and is integrally formed therewith, it will be apparent to those skilled in the art that the present invention is not limited thereto and the aperture may be disposed immediately in front of the first lens group 221 so as to be integrally formed therewith.

When the AF module 220 having such an integrated structure is mounted in the terminal, the size of the camera module 200 may be reduced and the assembly efficiency of the camera module 200 may be increased.

Referring to FIG. 4, the AF module 220 performs an auto-focusing function while moving the IRIS module 226 in the Z-axis direction using the AF driver 227. That is, the first lens group 221, the aperture 225, and the second lens group 223 are configured to perform an AF function while moving simultaneously in the Z-axis direction.

More specifically, the moving element 227b of the AF driver 227 may change the thickness thereof depending on the voltage applied to the AF driver 227 during AF operation, thereby causing the IRIS module 226 to move in the Z-axis direction. In an alternative embodiment, the moving element 227b may change the thickness thereof depending on a voltage applied to the AF driver 227 so as to move a moving member, and the IRIS module 226 may be moved in the Z-axis direction via the movement of the moving member.

FIGS. 5 to 7 are views referenced for explaining the configuration and driving method of the OIS module mounted in the camera module according to the present invention.

Referring to FIG. 5, the OIS driver 240 includes a frame 241 and a magnetic element (not illustrated).

The frame 241 may be formed in a rectangular shape or any of various other shapes so as to accommodate the module assembly 260 in which the AF module 220 and the sensor module 230 are coupled to each other. In addition, the frame 241 is coupled to the printed circuit board (not illustrated), which is disposed inside the terminal.

The magnetic element may be disposed on the frame 227a that comes into contact with the module assembly 260. In addition, a separate moving member (not illustrated) may be further disposed between the module assembly 260 and the magnetic element.

When the module assembly 260 is mounted inside the frame 241 of the OIS driver 240, an OIS module 270 is configured.

Referring to FIG. 6, the OIS module 270 performs a handshake correction function while moving the module assembly 260 in the X-axis direction and/or the Y-axis direction using the OIS driver 240. That is, the lens assembly and the image sensor are configured to perform a handshake correction function while moving simultaneously.

When a sensor (not illustrated), which is disposed inside the mobile terminal to sense shaking of the terminal, senses the shaking of the mobile terminal, current is applied to the OIS driver 240 based on information from the sensor so that the shaking of the mobile terminal is compensated for.

The magnetic element may move the module assembly 260 in the X-axis and/or the Y-axis direction by changing a magnetic field depending on the direction and strength of current applied to the OIS driver 240. In an alternative embodiment, the magnetic element may move a moving member by changing a magnetic field depending on the direction and strength of current applied to the OIS driver 240, and the module assembly 260 may be moved in the X-axis and/or the Y-axis direction via the movement of the moving member.

A conventional camera module performs a handshake correction function using a lens shift method by which only a lens assembly is moved, whereas the camera module according to the present invention performs a handshake correction function using a module tilt method, by which a lens assembly and an image sensor are moved simultaneously.

FIG. 7 is a view comparing the effect of handshake correction using a lens shift method with the effect of handshake correction using a module tilt method. It can be seen from FIG. 7 that, when an optical path is changed due to the user's handshake, the shaking phenomenon of an image formed on the image sensor may be more effectively reduced by moving the lens assembly and the image sensor simultaneously, compared to moving only the lens assembly.

As described above, the mobile terminal according to the exemplary embodiment of the present invention may realize reduced size and increased assembly efficiency of the camera module by mounting the camera module in which the first lens group, the second lens group, the aperture, and the AF driver are integrally formed with one another to the rear surface of the terminal body.

Figure 8:
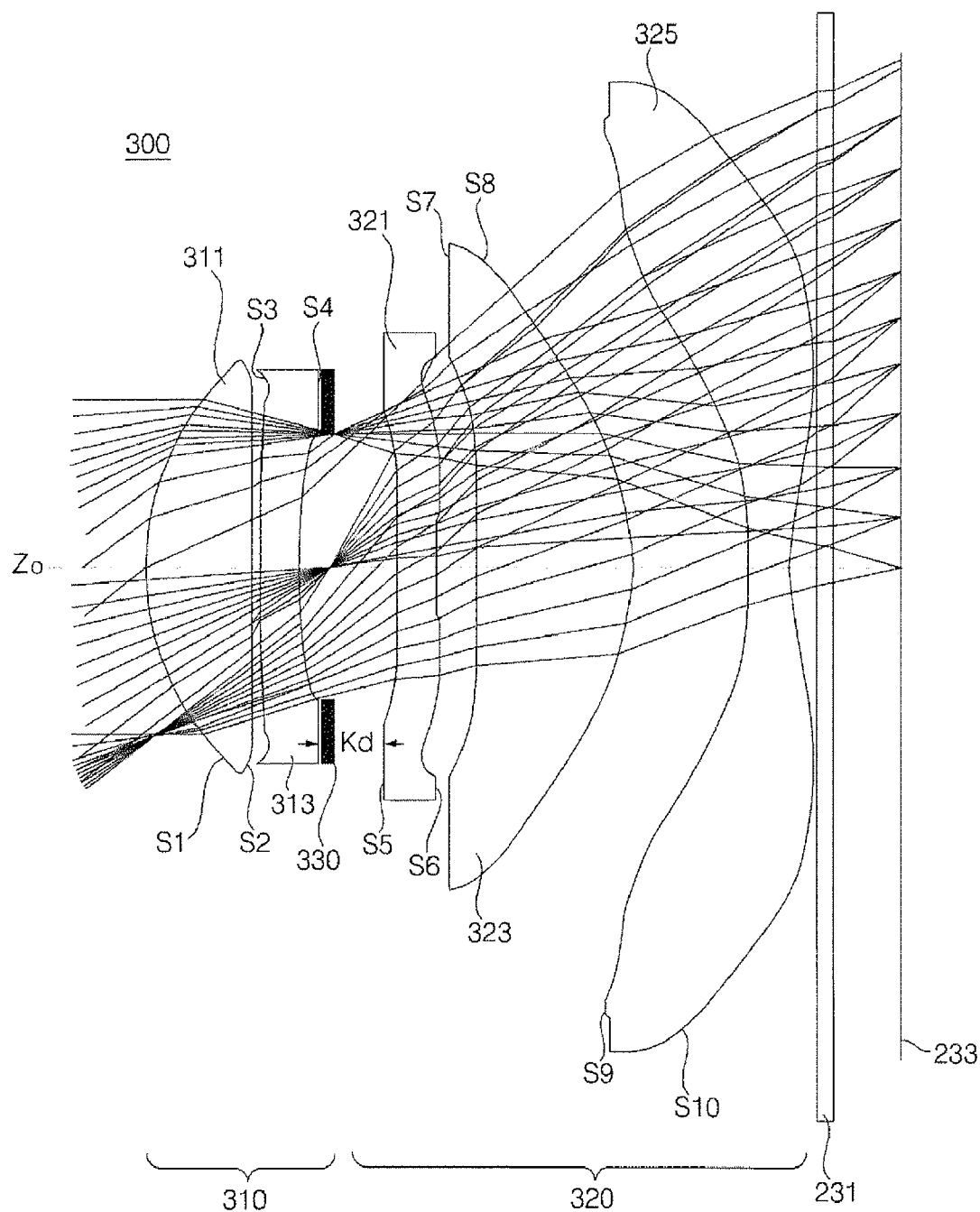
FIGS. 8 and 9 are views referenced for explaining the configuration of a lens assembly according to a first embodiment of the present invention.
Figure 9:
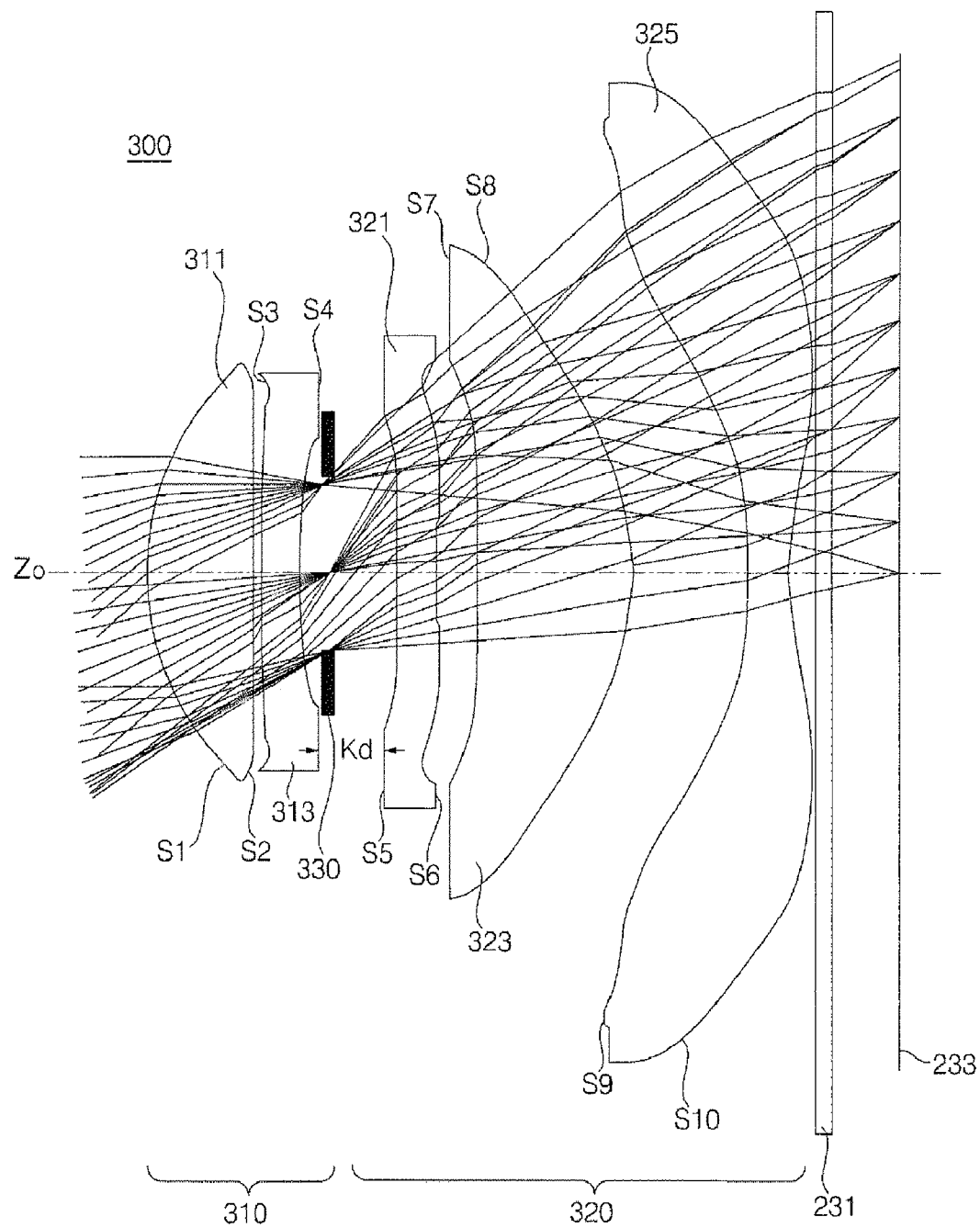

FIGS. 8 and 9 are views referenced for explaining the configuration of the lens assembly according to a first embodiment of the present invention. In the configuration of FIGS. 8 and 9, the thickness, size, and shape of a lens are somewhat exaggerated for the sake of description, and the shape of the spherical surface or the aspherical surface is proposed as an embodiment, without limitation thereto.

Referring to FIGS. 8 and 9, the lens assembly 300 according to the first embodiment of the present invention has a configuration in which a first lens group 310, a variable aperture 330, and a second lens group 320 are disposed in sequence from the object side.

The lens assembly 300 is configured by arranging a plurality of lenses in a line along an optical axis and is a device that refracts light so as to realize convergence of light rays from a subject on a single point. At this time, linearly directed light rays converge on a single point while passing through the lenses, thereby forming a single image. The distance between the image sensor 233 on which the image is formed and the lenses is referred to as a focal length.

Light that corresponds to image information of a subject passes through the first lens group 310, the variable aperture 330, and the second lens group 320 of the lens assembly 300 and through the infrared filter 231, and is then introduced into the image sensor 233.

In the following description of the configuration of each lens, the "object side surface" designates the surface of the lens that faces the object side on the basis of an optical axis Zo, and the "image side surface" designates the surface of the lens that faces an imaging surface on the basis of the optical axis Zo.

The first lens group 310 includes a first lens 311 and a second lens 313 and is integrally formed via a first lens barrel. The first lens 311 has a positive (+) refractive power (or refraction ability) and is configured such that an object side surface S1 thereof is convex. The second lens 313 has a negative (−) refractive power and is configured such that an image side surface S4 thereof is concave.

Here, that the lens has a positive refractive power generally means that the angle of emission of light introduced into the lens is reduced while the light passes through the lens, and that the lens has a negative refractive power generally means that the angle of emission of light introduced into the lens is increased while the light passes through the lens.

The second lens group 320 includes a third lens 321 to a fifth lens 325 and is integrally formed via a second lens barrel. The third lens 321 has a negative (−) refractive power and is configured such that an object side surface S5 thereof is concave. The fourth lens 323 has a positive (+) refractive power and is configured such that an image side surface S8 thereof is convex. The fifth lens 325 has a negative (−) refractive power.

The first to fifth lenses 311, 313, 321, 323 and 325 may be formed of a plastic material or a glass material having a predetermined index of refraction. In particular, when all lenses constituting the lens assembly 300 are manufactured using a plastic material, the manufacturing costs of the lens assembly 300 may be reduced and mass production may become possible.

In addition, each of the first to fifth lenses 311, 313, 321, 323 and 325 may be a lens having one aspherical surface or two aspherical surfaces, which may increase the resolution power of the lens and achieve excellent aberration characteristics.

The variable aperture 330 is disposed between the first lens group 310 and the second lens group 320 and adjusts the quantity of light to be introduced into an optical system. That is, the variable aperture 330 measures the quantity of light using a sensor (not illustrated) that detects external light so that the diameter of the aperture is adjusted so as to adjust the quantity of light that passes through the first lens group 310.

In order to provide a space in which the variable aperture 330 is mounted, the distance between the second lens 313 and the third lens 321 may range from 0.4 mm to 1.0 mm. In addition, the mounting space of the variable aperture 330 may be configured so as to satisfy the following condition formula 1.

$$0.06<|K_d/K_f|<0.16 \quad \text{[Condition Formula 1]}$$

Here, $K_d$ is the distance between the second lens and the third lens, and $K_f$ is the focal length of the second lens.

Unlike a fixed aperture, the variable aperture 330 adjusts the brightness (i.e. F-number) of a camera lens by changing the diameter of an opening thereof depending on the surrounding environment. Here, "F-number" is a numerical value that indicates the brightness of a lens, and is represented by F=f/d (here, f is the focal length of the optical system and D is the diameter of the aperture). Typically, the aperture is opened to receive a greater quantity of light through the optical system as the F-number is reduced, and is closed to receive a smaller quantity of light through the optical system as the F-number is increased.

The lens assembly 300 according to the first embodiment of the present invention has a variable optical lens structure having an F-number within a range from 1.8 to 2.8 depending on variation in the diameter of the variable aperture 330, which is disposed between the first lens group 310 and the second lens group 320. As illustrated in FIG. 8, when the diameter of the variable aperture 330 is increased, the lens assembly 300 according to the present invention receives a greater quantity of light through the optical system, thereby acquiring an image having a low F-number. On the other hand, as illustrated in FIG. 9, when the diameter of the variable aperture 330 is reduced, the lens assembly 300 according to the present invention receives a smaller quantity of light through the optical system, thereby acquiring an image having a high F-number.

The diameter of the variable aperture 330 required to acquire an image having a low F-number may be set to satisfy the following condition formula 2.

$$0.1<|K_a/K_s|<0.15 \quad \text{[Condition Formula 2]}$$

Here, $K_a$ is the diameter of the variable aperture, and $K_s$ is the diameter of the image sensor.

On the other hand, the diameter of the variable aperture 330 required to acquire an image having a high F-number may satisfy the following condition formula 3.

$$0.05<|K_a/K_s|<0.1 \quad \text{[Condition Formula 3]}$$

Here, $K_a$ is the diameter of the variable aperture, and $K_s$ is the diameter of the image sensor.

The variable aperture 330 according to the first embodiment of the present invention may be disposed between the second lens 313 and the third lens 321 of the lens assembly 300 having a positive/negative/negative/positive/negative (PNNPN, +−−+−) structure, and may compensate for deterioration in the resolution of an image and may effectively prevent the vignetting of an image by varying the diameter thereof.

In particular, when lenses having a negative refractive power are successively disposed at second and third positions from the object side, the magnitude of a chief ray angle (CRA) of light introduced into the imaging surface is increased, which enables a sufficiently large image to be acquired despite reduction in the diameter of the variable aperture 330. At this time, in order to increase the magnitude of the chief ray angle (CRA) through the second lens 313 and the third lens 321, the second lens 313 and the third lens 321 may be injection-molded using a plastic material or a glass material having a high refractive index of 1.6 or more.

A further description will be made with reference to FIGS. 8 and 9. Light that has converged via the first lens 311 having a positive refractive power is spread out to a sufficient size via the second lens 313 having a negative refractive power. Then, the light that has passed through the opening of the variable aperture 330 is again spread out to a sufficient size via the third lens 321 having a negative refractive power.

The light that has passed through the third lens 321 converges via the fourth lens 323 having a positive refractive power, which may enables correction of the resolution to an increased value. Finally, when the light having the corrected increased resolution is again spread out via the fifth lens 325 having a negative refractive power, a high-quality vivid image may be acquired despite variation in the diameter of the variable aperture 330.

In addition, when the variable aperture 330 is added between the first lens group 310 and the second lens group 320, it is possible to prevent distortion of color and a phenomenon in which a photograph turns white under a specific environment due to the reception of an excessive quantity of light.

As an example of such a phenomenon in which a photograph turns a specific color, in the case where a focused area is yellow when taking a photograph in the daytime in a state in which no aperture is provided, green may be distorted into blue. In addition, in the case where a dark area is focused on when shooting outdoors, the exposure to light excessively increases, causing the entire photograph to turn white. In addition, when a black-based dark object is focused on, the exposure to light excessively increases, causing the color of a brightly colored object to turn white. In these cases, it is possible to reduce the blurring of light or the distortion of color by disposing the aperture between the first lens group 310 and the second lens group 320.

The infrared filter 231 is disposed between the lens assembly 300 and the image sensor 233 and functions to prevent radiant heat from external light from being transferred to the image sensor 230. In addition, the infrared filter 231 functions to transmit visible light, but reflect infrared light to discharge the same to the outside. In an alternative embodiment, the infrared filter 231 may be configured as a coating film and may be attached to an image side surface S10 of the fifth lens 325.

The image sensor 233 converts an optical signal, which has passed through the first lens group 310, the variable aperture 330, the second lens group 320, and the infrared filter 231, into an electrical signal.

Condition formulas, which will be described below, are given as an embodiment that increases the operational effects of the lens assembly 300 according to the first embodiment of the present invention, and it will be apparent to those skilled in the art that the present invention is not necessarily configured based on the following condition formulas. For example, the lens configuration of the present invention may attain increased operation effects even when it satisfies only some of the condition formulas described below.

$1.0 < |K_1/K_t| < 1.5$ [Condition Formula 4]

$0.5 < |K_2/K_t| < 1.0$ [Condition Formula 5]

$0.2 < |K_3/K_t| < 1.0$ [Condition Formula 6]

$1.0 < |K_4/K_t| < 1.5$ [Condition Formula 7]

$1.3 < |K_5/K_t| < 2.0$ [Condition Formula 8]

Here, K is 1/the focal length f of a lens, $K_1$, $K_2$, $K_3$, $K_4$, and $K_5$ are respectively the refractive power of the first to fifth lenses, and $K_t$ is the total refractive power of all of the lenses.

The above condition formulas 4 to 8 prescribe the refractive power of the first lens to the fifth lens 311, 313, 321, 323 and 325, which constitute the lens assembly 300 according to the first embodiment of the present invention.

The following Table 1 represents the specifications of the first lens to the fifth lens, which constitute the lens assembly 300 according to the first embodiment of the present invention, in one implementation mode of the corresponding lens assembly 300. Here, the first to fifth lenses 311, 313, 321, 323 and 325 are designed to satisfy the above-described condition formulas.

of view (HFOV) of 38 degrees. The half field of view (HFOV) indicates half of the viewing angle capable of being captured by the camera lens. Thus, the lens assembly 300 according to the first embodiment of the present invention may secure a viewing angle of 70 degrees or more.

Meanwhile, the first lens to the fifth lens 311, 313, 321, 323 and 325, which constitute the lens assembly 300 according to the first embodiment of the present invention, have a refractive power with appropriately corrected spherical aberration and appropriate chromatic aberration based on the above-described Conditions 4 to 8. In addition, the spherical surface, mentioned in the embodiment of the present invention, may be acquired from the known Equation 1.

$$Z = \frac{cY^2}{1 + \sqrt{1 - (1+a)c^2Y^2}} + AY^4 + BY^6 + CY^8 + DY^{10} + EY^{12} + FY^{14} + \ldots$$ Equation 1

TABLE 1

| Lens | Surface Number | Radius of Curvature (R) | thickness | Index of Refraction (N) | Abbe's Number | Focal Length (f) | Condition Formula ($|K_n/K_t|$) |
|---|---|---|---|---|---|---|---|
| First Lens | 1* | 1.799863 | 0.749334 | 1.527163 | 58.1023 | 3.015211 | 1.41448 |
| | 2* | −11.75044 | 0.03582 | | | | |
| Second Lens | 3* | 80.84076 | 0.28 | 1.6492 | 22 | −5.61186 | 0.760781 |
| | 4* | 3.481362 | 0.187161 | | | | |
| Third Lens | 5* | 9.093687 | 0.28 | 1.6492 | 22 | −17.1887 | 0.248385 |
| | 6* | 4.949764 | 0.27781 | | | | |
| Fourth Lens | 7* | −79.90173 | 1.077984 | 1.56306 | 57.0059 | 3.332748 | 1.281045 |
| | 8* | −1.874447 | 0.819903 | | | | |
| Fifth Lens | 9* | −6.567036 | 0.296079 | 1.528108 | 54 | −2.81659 | 1.515805 |
| | 10* | 1.953426 | 0.145119 | | | | |

In the above Table 1, "*" next to the surface number indicates an aspherical surface.

Referring to Table 1, it can be found that the values of $|K_n/K_t|$ for the first to fifth lenses are 1.41448, 0.760781, 0.248385, 1.281045, and 1.515805, and thus, the first to fifth lenses satisfy the above-described condition formulas 4 to 8.

In addition, the lens assembly 300 having a configuration corresponding to the embodiment of Table 1 has a half field Here, Z is the distance from the apex of the lens in the optical axis direction, c is the basic curvature of the lens, Y is the distance in the direction orthogonal to the optical axis, α is a conic constant, and A, B, C, D, E and F are aspherical coefficients of respective orders.

The following Table 2 represents the value of the aspherical coefficient of the respective lenses, which constitute the lens assembly according to the embodiment of Table 1.

TABLE 2

| | First Lens | | Second Lens | | Third Lens | |
|---|---|---|---|---|---|---|
| Class | 1* | 2* | 3* | 4* | 5* | 6* |
| α | −0.546180 | −4.809085 | 0 | −18.107720 | 43.435566 | −46.846995 |
| A | 0.009280 | 0.069024 | 0.046195 | 0.048016 | −0.139993 | −0.078585 |
| B | 0.015717 | −0.005305 | 0.022435 | −0.000553 | −0.0116127 | −0.039202 |
| C | −0.015214 | −0.036019 | −0.065152 | 0.012344 | 0.047212 | 0.030194 |
| D | 0.015522 | 0.002654 | 0.050403 | −0.039432 | −0.052147 | −0.006561 |
| E | −0.006401 | 0.015423 | 0.022382 | 0.027312 | 0.013156 | −0.007010 |
| F | 0 | −0.005577 | −0.008400 | 0 | 0.005026 | 0.005094 |
| G | 0 | 0 | 0 | 0 | 0 | 0 |
| H | 0 | 0 | 0 | 0 | 0 | 0 |
| I | 0 | 0 | 0 | 0 | 0 | 0 |

TABLE 2-continued

| | Fourth Lens | | Fifth Lens | |
|---|---|---|---|---|
| Class | 7* | 8* | 9* | 10* |
| α | 0 | −0.4379732 | −3.8680482 | −9.159089 |
| A | −0.015313 | 0.035133 | −0.149112 | −0.070571 |
| B | −0.024673 | −0.014883 | 0.070545 | 0.023720 |
| C | 0.00663 | 0.004553 | −0.037725 | −0.004791 |
| D | 0.004547 | 0.000010 | 0.002626 | 0.000476 |
| E | −0.000392 | −0.000141 | −0.000208 | −0.000020 |
| F | 0.000174 | 0.000012 | 0.000007 | 0 |
| G | 0 | 0 | 0 | 0 |
| H | 0 | 0 | 0 | 0 |
| I | 0 | 0 | 0 | 0 |

Figure 10:
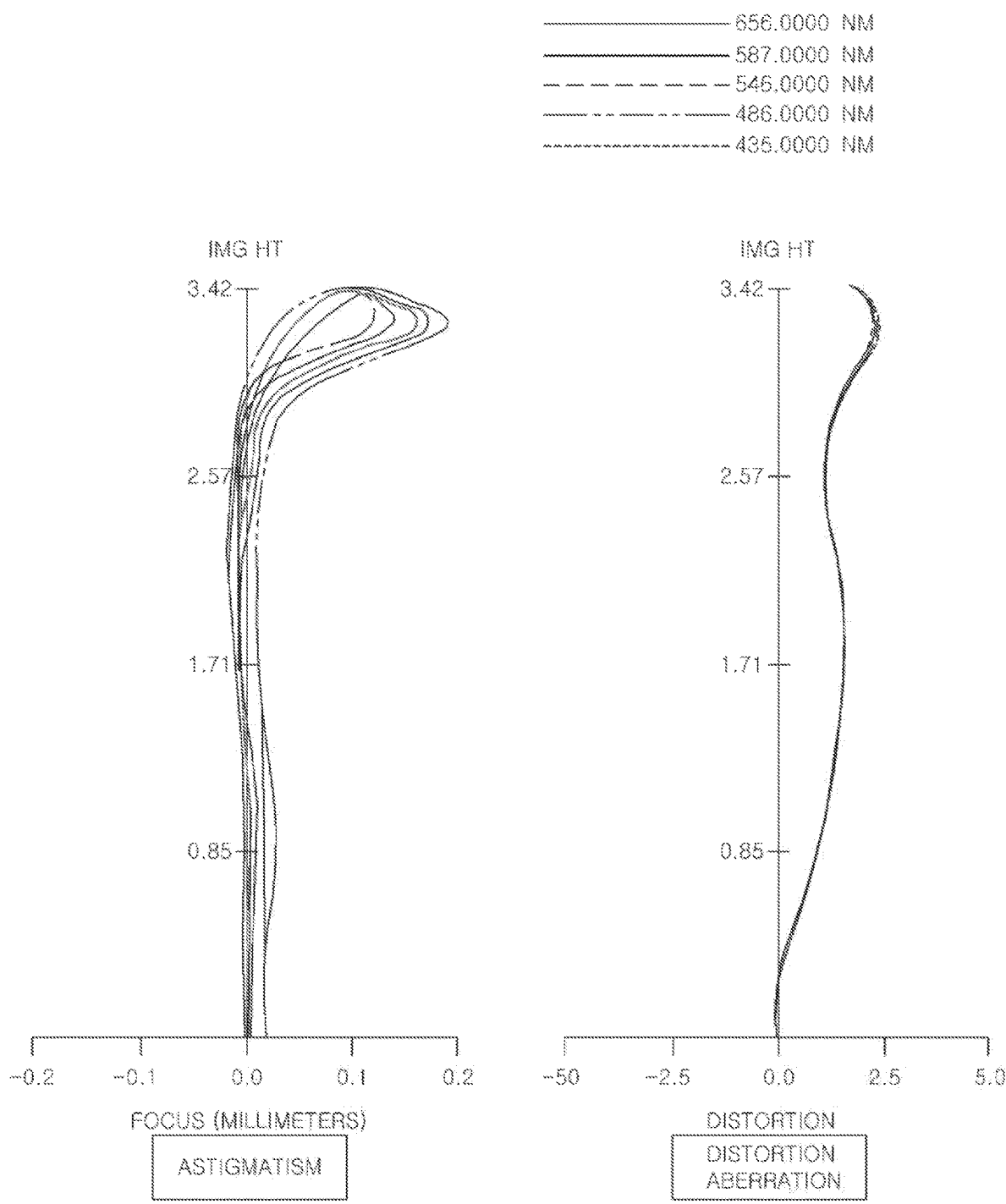
FIG. 10 is a graph illustrating the aberration characteristics of the lens assembly according to the first embodiment of the present invention.

FIG. 10 is a graph illustrating the aberration characteristics of the lens assembly according to the first embodiment of the present invention. The graph illustrates the measured results of astigmatism and distortion aberration in sequence from the left side. Here, "astigmatism" is a phenomenon in which light that has passed through the lens forms an image on an arbitrary curved plane, rather than forming an image on a flat plane, and "distortion aberration" is a phenomenon in which the magnification is changed depending on the position of the lens due to various factors such as a processing error or a light introduction direction.

In FIG. 10, the Y-axis represents the size of a formed image and the X-axis represents the focal length (mm) and the degree of distortion (%). Generally, it is interpreted that the closer the astigmatic field curves are to the Y-axis, the better the aberration correction function. Thus, since the values of images are close to the Y-axis in almost all fields of the astigmatic field curves illustrated in FIG. 10, it can be found that both the astigmatism and the distortion aberration have excellent numerical values.

Meanwhile, it will be apparent to those skilled in the art that, although one embodiment related to the lens assembly 300, which satisfies the above-described condition formulas, has been illustrated and described herein, the disclosure is not limited thereto, and various other embodiments, which satisfy the condition formulas, may be realized.

Figure 11:
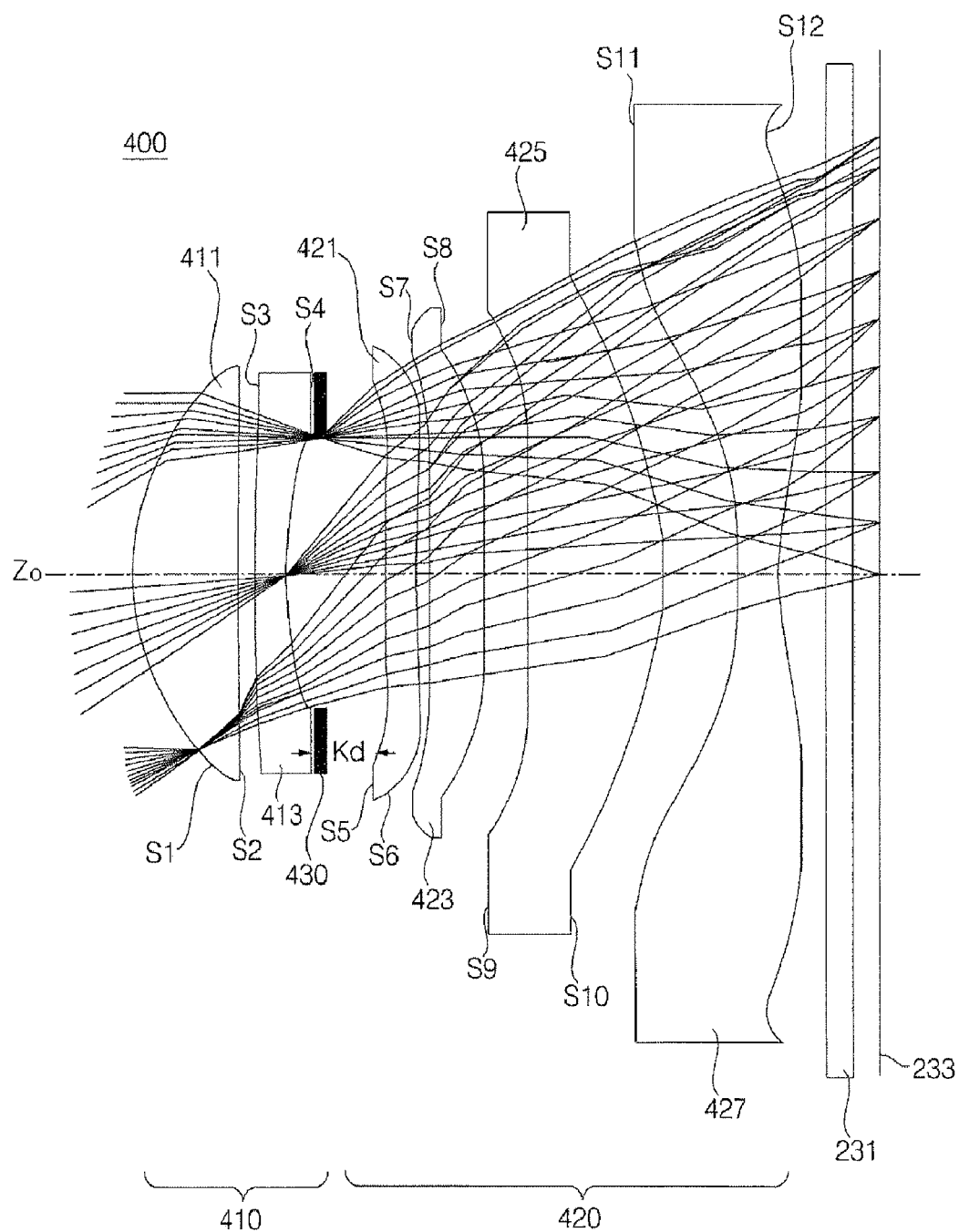
FIGS. 11 and 12 are views referenced for explaining the configuration of a lens assembly according to a second embodiment of the present invention.
Figure 12:
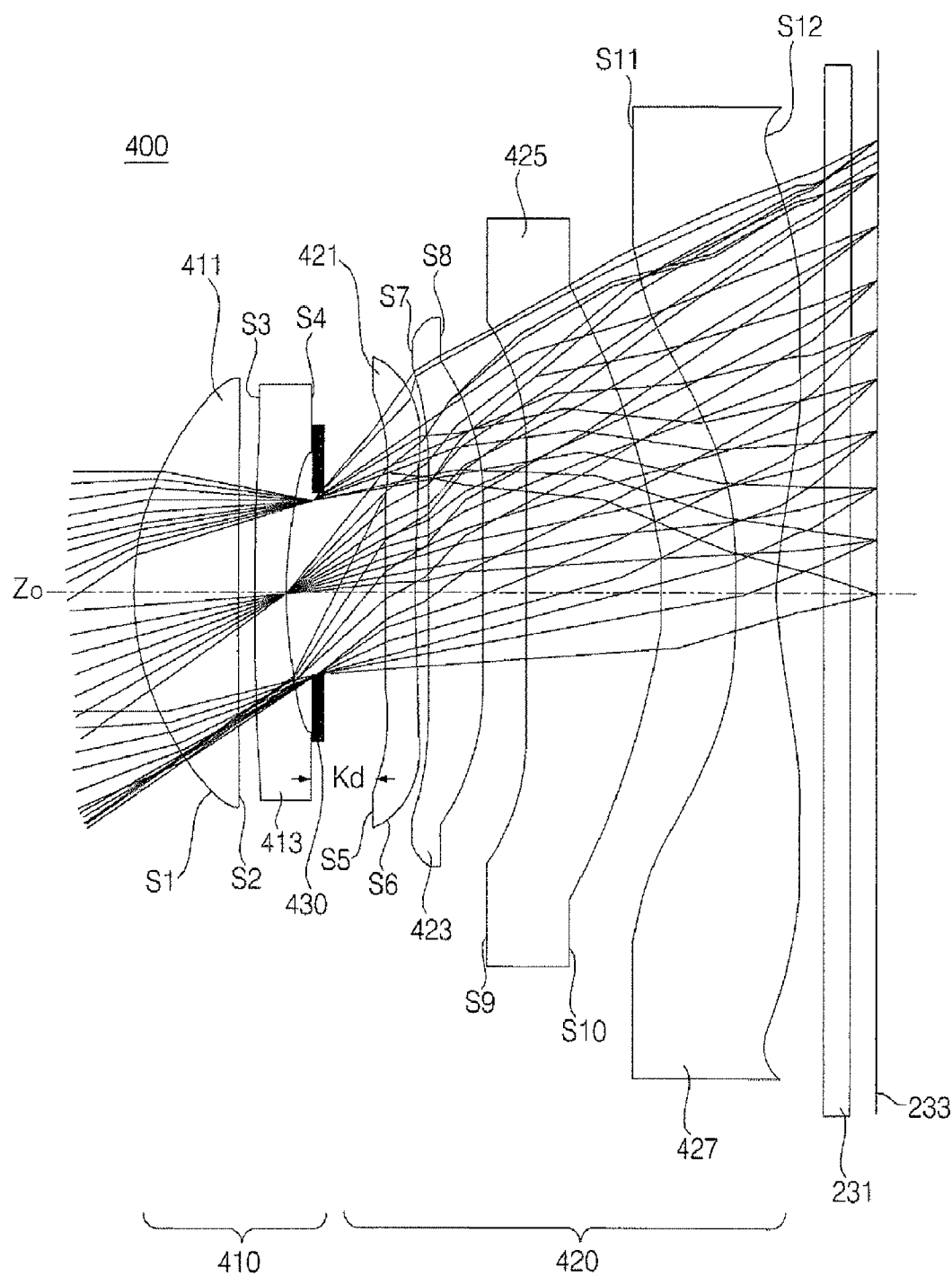

FIGS. 11 and 12 are views referenced for explaining the configuration of a lens assembly according to a second embodiment of the present invention. The lens assembly according to the first embodiment of the present invention has an optical lens structure including five lenses, whereas the lens assembly according to the second embodiment of the present invention has an optical lens structure including six lenses.

Referring to FIGS. 11 and 12, the lens assembly 400 according to the second embodiment of the present invention is configured such that a first lens group 410, a variable aperture 430, and a second lens group 420 are disposed in sequence from the object side.

Light that corresponds to image information of a subject passes through the first lens group 410, the variable aperture 430, and the second lens group 420 of the lens assembly 400 and through the infrared filter 231, and is then introduced into the image sensor 233.

The first lens group 410 includes a first lens 411 and a second lens 413 and is integrally formed via a first lens barrel. The first lens 411 has a positive (+) refractive power and is configured such that the object side surface S1 thereof is convex. The second lens 413 has a negative (−) refractive power and is configured such that the image side surface S4 thereof is concave.

The second lens group 420 includes a third lens 421 to a sixth lens 427 and is integrally formed via a second lens barrel. The third lens 421 has a negative (−) refractive power and is configured such that the object side surface S5 thereof is concave. The fourth lens 423 and the fifth lens 425 have a positive (+) refractive power. The sixth lens 427 has a negative (−) refractive power.

The first to sixth lenses 411, 413, 421, 423, 425 and 427 may be formed of a plastic material or a glass material having a predetermined index of refraction. In particular, when all lenses constituting the lens assembly 400 are manufactured using a plastic material, the manufacturing costs of the lens assembly 400 may be reduced and mass production may become possible.

In addition, each of the first to sixth lenses 411, 413, 421, 423, 425 and 427 may be a lens having one aspherical surface or two aspherical surfaces, which may increase the resolution power of the lens and achieve excellent aberration characteristics.

The variable aperture 430 is disposed between the first lens group 410 and the second lens group 420 and adjusts the quantity of light to be introduced into an optical system. In order to provide a space in which the variable aperture 430 is mounted, the distance between the second lens 413 and the third lens 421 may range from 0.4 mm to 1.0 mm.

In addition, the mounting space of the variable aperture 430 may be configured so as to satisfy the following condition formula 9.

$$0.05 < |K_d/K_f| < 0.15 \quad \text{[Condition Formula 9]}$$

Here, $K_d$ is the distance between the second lens and the third lens, and $K_f$ is the focal length of the second lens.

Unlike a fixed aperture, the variable aperture 430 adjusts the brightness (i.e. F-number) of a camera lens by changing the diameter of an opening thereof depending on the surrounding environment. In the same manner as the lens assembly 300 according to the above-described first embodiment, the lens assembly 400 according to the second embodiment of the present invention has a variable optical lens structure having an F-number within a range from 1.8 to 2.8 depending on variation in the diameter of the variable aperture 430, which is disposed between the first lens group 410 and the second lens group 420.

As illustrated in FIG. 11, when the diameter of the variable aperture 430 is increased, the lens assembly 400 according to the present invention receives a greater quantity of light through the optical system, thereby acquiring an image having a low F-number. On the other hand, as illustrated in FIG. 12, when the diameter of the variable aperture 430 is reduced, the lens assembly 400 according to the present invention receives a smaller quantity of light through the optical system, thereby acquiring an image having a high F-number.

The diameter of the variable aperture 430 required to acquire an image having a low F-number may be set to satisfy the following condition formula 10.

$$0.1 < |K_a/K_s| < 0.15 \qquad \text{[Condition Formula 10]}$$

Here, $K_a$ is the diameter of the variable aperture, and $K_s$ is the diameter of the image sensor.

On the other hand, the diameter of the variable aperture 430 required to acquire an image having a high F-number may satisfy the following condition formula 11.

$$0.05 < |K_a/K_s| < 0.1 \qquad \text{[Condition Formula 11]}$$

Here, $K_a$ is the diameter of the variable aperture, and $K_s$ is the diameter of the image sensor.

The variable aperture 430 according to the second embodiment of the present invention may be disposed between the second lens 413 and the third lens 421 of the lens assembly 400 having a positive/negative/negative/positive/positive/negative (PNNPPN, +−−++−) structure, and may compensate for deterioration in the resolution of an image and may effectively prevent the vignetting of an image by varying the diameter thereof.

In particular, when lenses having a negative refractive power are successively disposed at second and third positions from the object side, the magnitude of a chief ray angle (CRA) of light introduced into the imaging surface is increased, which enables a sufficiently large image to be acquired despite reduction in the diameter of the variable aperture 430. At this time, in order to increase the magnitude of the chief ray angle (CRA) through the second lens 413 and the third lens 421, the second lens 413 and the third lens 421 may be injection-molded using a plastic material or a glass material having a high refractive index of 1.6 or more.

A further description will be made with reference to FIGS. 11 and 12. Light that has converged via the first lens 411 having a positive refractive power is spread out to a sufficient size via the second lens 413 having a negative refractive power. Then, the light that has passed through the opening of the variable aperture 430 is again spread out to a sufficient size via the third lens 421 having a negative refractive power.

The light that has passed through the third lens 421 converges via the fourth lens 423 and the fifth lens 425, which have a positive refractive power, so that the resolution may be corrected to an increased value. Finally, when the light having the corrected increased resolution is again spread out via the sixth lens 427 having a negative refractive power, a high-quality vivid image may be acquired despite variation in the diameter of the variable aperture 430.

The infrared filter 231 is disposed between the lens assembly 400 and the image sensor 233 and functions to prevent radiant heat from external light from being transferred to the image sensor 233. In addition, the infrared filter 231 functions to transmit visible light, but reflect infrared light to discharge the same to the outside. In an alternative embodiment, the infrared filter 231 may be configured as a coating film and may be attached to an image side surface S12 of the sixth lens 427.

The image sensor 233 converts an optical signal, which has passed through the first lens group 410, the variable aperture 430, the second lens group 420, and the infrared filter 231, into an electrical signal.

Condition formulas, which will be described below, are given as an embodiment that increases the operational effects of the lens assembly 400 according to the second embodiment of the present invention, and it will be apparent to those skilled in the art that the present invention is not necessarily configured based on the following condition formulas. For example, the lens configuration of the present invention may attain increased operation effects even when it satisfies only some of the condition formulas described below.

$$1.0 < |K_1/K_t| < 1.5 \qquad \text{[Condition Formula 12]}$$

$$0.5 < |K_2/K_t| < 1.0 \qquad \text{[Condition Formula 13]}$$

$$0.1 < |K_3/K_t| < 1.0 \qquad \text{[Condition Formula 14]}$$

$$0.1 < |K_4/K_t| < 1.0 \qquad \text{[Condition Formula 15]}$$

$$1.0 < |K_5/K_t| < 1.5 \qquad \text{[Condition Formula 16]}$$

$$1.5 < |K_6/K_t| < 2.5 \qquad \text{[Condition Formula 17]}$$

Here, K is 1/the focal length f of a lens, $K_1$, $K_2$, $K_3$, $K_4$, $K_5$, and $K_6$ are respectively the refractive power of the first to sixth lenses, and $K_t$ is the total refractive power of all of the lenses.

The above condition formulas 12 to 17 prescribe the refractive power of the first lens to the sixth lens 411, 413, 421, 423, 425 and 427, which constitute the lens assembly 400 according to the second embodiment of the present invention.

The following Table 3 represents the specifications of the first lens to the sixth lens, which constitute the lens assembly 400 according to the second embodiment of the present invention, in one implementation mode of the corresponding lens assembly 400. Here, the first to sixth lenses are designed to satisfy the above-described condition formulas.

TABLE 3

| Lens | Surface Number | Radius of Curvature (R) | thickness | Index of Refraction (N) | Abbe's Number | Focal Length (f) | Condition Formula ($|K_n/K_t|$) |
|---|---|---|---|---|---|---|---|
| First Lens | 1* | 1.809582 | 0.758757 | 1.528208 | 54 | 3.438052 | 1.318741 |
|  | 2* | 437.3755 | 0.1 |  |  |  |  |
| Second Lens | 3* | 5.263811 | 0.25 | 1.6452 | 22 | −5.66738 | 0.799599 |
|  | 4* | 2.125094 | 0.514792 |  |  |  |  |
| Third Lens | 5* | 6.707334 | 0.25 | 1.6492 | 22 | −44.0202 | 0.102996 |
|  | 6* | 5.352641 | 0.1 |  |  |  |  |

TABLE 3-continued

| Lens | Surface Number | Radius of Curvature (R) | thickness | Index of Refraction (N) | Abbe's Number | Focal Length (f) | Condition Formula ($|K_n/K_t|$) |
|---|---|---|---|---|---|---|---|
| Fourth Lens | 7* | 11.10611 | 0.395853 | 1.528208 | 54 | 22.71456 | 0.199611 |
|  | 8* | 147.6306 | 0.309349 |  |  |  |  |
| Fifth Lens | 9* | 12.70997 | 1.006283 | 1.528208 | 54 | 3.181482 | 1.425091 |
|  | 10* | −1.883534 | 0.570752 |  |  |  |  |
| Sixth Lens | 11* | −2.314944 | 0.26 | 1.528208 | 54 | −2.16132 | 2.09775 |
|  | 12* | 2.338848 | 0.349071 |  |  |  |  |

In the above Table 3, "*" next to the surface number indicates an aspherical surface.

Referring to Table 3, it can be found that the values of $|K_n/K_t|$ for the first to sixth lenses are 1.318741, 0.799599, 0.102996, 0.199611, 1.425091, and 2.09775, and thus, the first to fifth lenses satisfy the above-described condition formulas 12 to 17.

In addition, the lens assembly 400 having a configuration corresponding to the embodiment of Table 3 has a half field of view (HFOV) of 35 degrees. The half field of view (HFOV) indicates half of the viewing angle capable of being captured by the camera lens. Thus, the lens assembly 400 according to the second embodiment of the present invention may secure a viewing angle of 60 degrees or more.

Meanwhile, the first lens to the sixth lens 411, 413, 421, 423, 425, and 427, which constitute the lens assembly 400 according to the second embodiment of the present invention, have a refractive power with appropriately corrected spherical aberration and appropriate chromatic aberration based on the above-described condition formulas 12 to 17. In addition, the spherical surface, mentioned in the embodiment of the present invention, may be acquired from the known Equation 1.

The following Table 4 represents the value of the aspherical coefficient of the respective lenses, which constitute the lens assembly according to the embodiment of Table 3.

Figure 13:
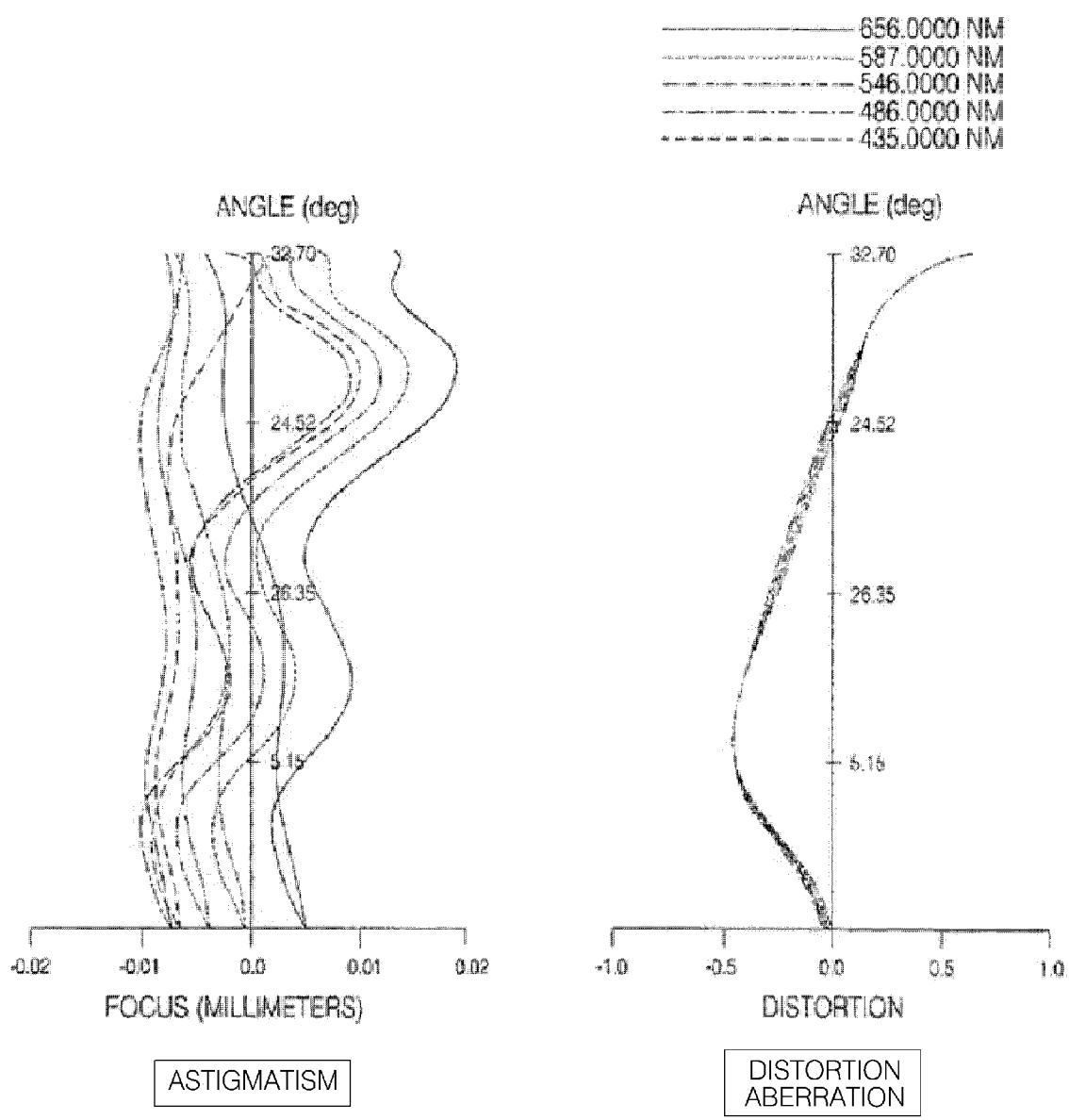
FIG. 13 is a graph illustrating the aberration characteristics of the lens assembly according to the second embodiment of the present invention.

FIG. 13 is a graph illustrating the aberration characteristics of the lens assembly according to the second embodiment of the present invention. The graph illustrates the measured results of astigmatism and distortion aberration in sequence from the left side.

In FIG. 13, the Y-axis represents the size of a formed image and the X-axis represents the focal length (mm) and the degree of distortion (%). Generally, it is interpreted that the closer the astigmatic field curves are to the Y-axis, the better the aberration correction function. Thus, since the values of images are close to the Y-axis in almost all fields of the astigmatic field curves illustrated in FIG. 13, it can be found that both the astigmatism and the distortion aberration have excellent numerical values.

Meanwhile, it will be apparent to those skilled in the art that, although one embodiment related to the lens assembly 400, which satisfies the above-described condition formulas, has been illustrated and described herein, the disclosure is not limited thereto, and various other embodiments, which satisfy the condition formulas, may be realized.

As described above, in a mobile terminal according to the present invention, a lens assembly in which a variable aperture is disposed between a first lens group and a second lens group is mounted in a camera module, whereby the vignetting of an image may be prevented and a high-quality vivid image may be realized.

TABLE 4

|  | First Lens | | Second Lens | | Third Lens | |
|---|---|---|---|---|---|---|
| Class | 1* | 2* | 3* | 4* | 5* | 6* |
| α | 0.32111 | 0 | −16.12272 | −7.88322 | −15.8512 | −97.2111 |
| A | −0.003181 | 0.005716 | −0.004518 | 0.043422 | −0.05325 | −0.02981 |
| B | 1.70E−03 | 1.62E−02 | 1.92E−02 | 1.76E−02 | 0.009306 | −0.00718 |
| C | −3.93E−03 | −2.68E−03 | −1.15E−02 | −1.07E−03 | −0.00215 | −8.68E−06 |
| D | 7.28E−03 | 1.07E−02 | −6.33E−03 | −8.42E−03 | −0.01757 | −2.51E−03 |
| E | −5.53E−03 | 4.71E−03 | 8.25E−03 | 1.22E−02 | 9.12E−03 | 5.57E−05 |
| F | 1.47E−03 | 1.60E−03 | 0 | 0 | 0 | 0 |
| G | 0 | 0 | 0 | 0 | 0 | 0 |
| H | 0 | 0 | 0 | 0 | 0 | 0 |
| I | 0 | 0 | 0 | 0 | 0 | 0 |

|  | Fourth Lens | | Fifth Lens | | Sixth Lens | |
|---|---|---|---|---|---|---|
| Class | 7* | 8* | 9* | 10* | 11* | 12* |
| α | 0 | 80.01413 | 50.972175 | −5.19428 | −0.05017 | −19.2579 |
| A | −0.06754 | −0.08206 | −0.029169 | −0.00659 | −0.01006 | −0.02708 |
| B | 0.015934 | 0.006796 | −0.006838 | −0.00026 | 0.010046 | 0.006955 |
| C | −0.00277 | −0.00286 | −0.001099 | 0.000208 | 0.000176 | −0.00123 |
| D | 0.000185 | 5.45E−04 | 0.0001894 | 1.17E−06 | −0.00015 | 1.10E−04 |
| E | 6.12E−04 | 3.80E−04 | 0 | 0 | 0 | 0 |
| F | 0 | 0 | 0 | 0 | 0 | 0 |
| G | 0 | 0 | 0 | 0 |  |  |
| H | 0 | 0 | 0 | 0 |  |  |
| I | 0 | 0 | 0 | 0 |  |  |

The invention described above may be realized as a computer-readable code in a medium in which programs are recorded. The computer-readable medium includes all types of recording device in which data, which may be read by a computer system, are stored. Examples of the computer-readable medium may include a hard disk drive (HDD), solid state disk (SSD), silicon disk drive (SDD), ROM, RAM, CD-ROM, magnetic tape, floppy disc, or optical data storage device. In addition, the computer-readable medium may be realized in a carrier wave (e.g., transmission via the Internet). In addition, the computer may include the controller 180 of the terminal. Thus, the above detailed description should not be construed as being limitative in all terms, but should be considered as being illustrative. The scope of the disclosure should be determined by the rational analysis of the accompanying claims, and all changes within the equivalent range of the disclosure are included in the scope of the disclosure.

The invention claimed is:

1. A camera module of a mobile terminal, the camera module comprising:
    a first lens group including a first lens having a positive (+) refractive power and a second lens having a negative (−) refractive power in sequence from an object side, the first and second lenses being integrally formed via a first lens barrel;
    a variable aperture configured to adjust a quantity of light introduced into an optical system; and
    a second lens group including a third lens having a negative (−) refractive power, a fourth lens having a positive (+) refractive power, and a fifth lens having a negative (−) refractive power, the third to fifth lenses being integrally formed via a second lens barrel,
    wherein the variable aperture is disposed between the second lens and the third lens, and the first lens barrel is inserted into a first face of the variable aperture and the second lens barrel is inserted into a second face of the variable aperture, and
    wherein the quantity of light adjusted by the variable aperture, passes through the second lens group, and is then introduced into an image sensor.

2. The camera module according to claim 1, wherein the second lens and the third lens are spaced apart from each other by a distance ranging from 0.4 mm to 1.0 mm.

3. The camera module according to claim 1, wherein the variable aperture is mounted in a space that satisfies the following condition formula 1:

$$0.06<|K_d/K_f|<0.16 \qquad \text{[Condition Formula 1]}$$

(here, $K_d$ is a distance between the second lens and the third lens, and $K_f$ is a focal length of the second lens).

4. The camera module according to claim 1, wherein the variable aperture has a diameter required to capture an image having a low F-number, the diameter satisfying the following condition formula 2, and has a diameter required to capture an image having a high F-number, the diameter satisfying the following condition formula 3:

$$0.1<|K_a/K_s|<0.15 \qquad \text{[Condition Formula 2]}$$

$$0.05<|K_a/K_s|<0.1 \qquad \text{[Condition Formula 3]}$$

(here, $K_a$ is the diameter of the variable aperture, and $K_s$ is a diameter of an image sensor).

5. The camera module according to claim 1, wherein the second lens and the third lens are formed of a plastic material having a high refractive index of 1.6 or more.

6. The camera module according to claim 1, wherein the first lens satisfies the following condition formula 3:

$$1.0<|K_1/K_t|<1.5 \qquad \text{[Condition Formula 3]}$$

(here, $K_1$ is a refractive power of the first lens, and $K_t$ is a total refractive power of all of the lenses).

7. The camera module according to claim 1, wherein the second lens satisfies the following condition formula 4:

$$0.5<|K_2/K_t|<1.0 \qquad \text{[Condition Formula 4]}$$

(here, $K_2$ is a refractive power of the second lens, and Kt is a total refractive power of all of the lenses).

8. The camera module according to claim 1, wherein the third lens satisfies the following condition formula 5:

$$0.2<|K_3/K_t|<1.0 \qquad \text{[Condition Formula 5]}$$

(here, $K_3$ is a refractive power of the third lens, and Kt is a total refractive power of all of the lenses).

9. The camera module according to claim 1, wherein the fourth lens satisfies the following condition formula 6:

$$1.0<|K_4/K_t|<1.5 \qquad \text{[Condition Formula 6]}$$

(here, $K_4$ is a refractive power of the fourth lens, and $K_t$ is a total refractive power of all of the lenses).

10. The camera module according to claim 1, wherein the fifth lens satisfies the following condition formula 7:

$$1.3<|K_5/K_t|<2.0 \qquad \text{[Condition Formula 7]}$$

(here, $K_5$ is a refractive power of the fifth lens, and $K_t$ is a total refractive power of all of the lenses).

11. The camera module according to claim 1, wherein the first lens barrel and the second lens barrel are constitute an IRIS module having an integrated structure.

12. The camera module according to claim 11, further comprising an AF driver configured to perform an auto-focusing function by moving the IRIS module in a Z-axis direction,
    wherein the IRIS module is inserted into a frame of the AF driver so as to constitute an AF module having an integrated structure.

13. The camera module according to claim 12, further comprising an OIS driver configured to perform a handshake correction function by moving the AF module in an X-axis or Y-axis direction,
    wherein the AF module and a sensor module are coupled to each other so as to constitute a module assembly, and the module assembly is mounted in a frame of the OIS driver so as to constitute an OIS module.

14. The camera module according to claim 13, wherein the OIS module performs the handshake correction function using a module tilt method by which a lens assembly and an image sensor are moved simultaneously.

15. The camera module according to claim 1, wherein a distance between the second lens and the third lens is set corresponding to a focal length of the second lens.

16. A camera module of a mobile terminal, the camera module comprising:
    a first lens group including a first lens having a positive (+) refractive power and a second lens having a negative (−) refractive power in sequence from an object side, the first and second lenses being integrally formed via a first lens barrel;

a variable aperture configured to adjust a quantity of light introduced into an optical system; and a second lens group including a third lens having a negative (−) refractive power, a fourth lens having a positive (+) refractive power, a fifth lens having a positive (+) refractive power, and a sixth lens having a negative (−) refractive power, the third to sixth lenses being integrally formed via a second lens barrel, wherein the variable aperture is disposed between the second lens and the third lens, and the first lens barrel is inserted into a first face of the variable aperture and the second lens barrel is inserted into a second face of the variable aperture, and wherein the quantity of light adjusted by the variable aperture, passes through the second lens group, and is introduced into an image sensor.

17. The camera module according to claim 16, wherein the second lens and the third lens are spaced apart from each other by a distance ranging from 0.4 mm to 1.0 mm.

18. The camera module according to claim 16, wherein the variable aperture is mounted in a space that satisfies the following condition formula 8:

$$0.05 < |K_d/K_f| < 0.15 \qquad \text{[Condition Formula 8]}$$

(here, $K_d$ is a distance between the second lens and the third lens, and $K_f$ is a focal length of the second lens).

19. The camera module according to claim 16, wherein the variable aperture has a diameter required to capture an image having a low F-number, the diameter satisfying the following condition formula 9, and has a diameter required to capture an image having a high F-number, the diameter satisfying the following condition formula 10:

$$0.1 < |K_a/K_s| < 0.15 \qquad \text{[Condition Formula 9]}$$

$$0.05 < |K_a/K_s| < 0.1 \qquad \text{[Condition Formula 10]}$$

(here, $K_a$ is the diameter of the variable aperture, and $K_s$ is a diameter of an image sensor).

20. The camera module according to claim 16, wherein the second lens and the third lens are formed of a plastic material having a high refractive index of 1.6 or more.

21. The camera module according to claim 16, wherein the first lens satisfies the following condition formula 11:

$$1.0 < |K_1/K_t| < 1.5 \qquad \text{[Condition Formula 11]}$$

(here, $K_1$ is a refractive power of the first lens, and $K_t$ is a total refractive power of all of the lenses).

22. The camera module according to claim 16, wherein the second lens satisfies the following condition formula 12:

$$0.5 < |K_2/K_t| < 0.1 \qquad \text{[Condition Formula 12]}$$

(here, $K_2$ is a refractive power of the second lens, and $K_t$ is a total refractive power of all of the lenses).

23. The camera module according to claim 16, wherein the third lens satisfies the following condition formula 13:

$$0.1 < |K_3/K_t| < 1.0 \qquad \text{[Condition Formula 13]}$$

(here, K3 is a refractive power of the third lens, and Kt is a total refractive power of all of the lenses).

24. The camera module according to claim 16, wherein the fourth lens satisfies the following condition formula 14:

$$0.1 < |K_4/K_t| < 1.0 \qquad \text{[Condition Formula 14]}$$

(here, $K_4$ is a refractive power of the fourth lens, and Kt is a total refractive power of all of the lenses).

25. The camera module according to claim 16, wherein the fifth lens satisfies the following condition formula 15:

$$1.0 < |K_5/K_t| < 1.5 \qquad \text{[Condition Formula 15]}$$

(here, $K_5$ is a refractive power of the fifth lens, and $K_t$ is a total refractive power of all of the lenses).

26. The camera module according to claim 16, wherein the sixth lens satisfies the following condition formula 16:

$$1.5 < |K_6/K_t| < 2.5 \qquad \text{[Condition Formula 16]}$$

(here, $K_6$ is a refractive power of the sixth lens, and Kt is a total refractive power of all of the lenses).

27. The camera module according to claim 16, wherein a distance between the second lens and the third lens is set corresponding to a focal length of the second lens.

* * * * *